(12) United States Patent
Nakamura

(10) Patent No.: US 7,450,323 B2
(45) Date of Patent: Nov. 11, 2008

(54) IMAGING LENS AND IMAGING DEVICE INCLUDING THE IMAGING LENS

(75) Inventor: Masato Nakamura, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/986,152

(22) Filed: Nov. 20, 2007

(65) Prior Publication Data

US 2008/0151394 A1    Jun. 26, 2008

(30) Foreign Application Priority Data

Nov. 21, 2006    (JP) .............................. 2006-314529

(51) Int. Cl.
G02B 9/12    (2006.01)
(52) U.S. Cl. ..................................... 359/784
(58) Field of Classification Search ................ 359/790, 359/784, 775, 771, 757, 689, 688
See application file for complete search history.

(56) References Cited

U.S. PATENT DOCUMENTS

2006/0066748 A1 *  3/2006  Isono ......................... 348/360

FOREIGN PATENT DOCUMENTS

| JP | 10-301021   | 11/1998 |
| JP | 2001-075006 | 3/2001  |
| JP | 2003-149545 | 5/2003  |

* cited by examiner

*Primary Examiner*—Timothy J Thompson
(74) *Attorney, Agent, or Firm*—William L. Androlia; H. Henry Koda

(57) ABSTRACT

It is to provide an imaging lens and an imaging device including the imaging lens that can secure telecentricity and achieve excellent resolution through sufficient correction of various aberrations, while being compact and light.

The imaging lens comprises, in order from an object side to an image surface side, a first lens 2 that is a meniscus lens having a positive power whose convex surface faces the object side, a diaphragm 3, a second lens 4 that is a meniscus lens having a negative power whose convex surface faces the image surface side, and a third lens 5 that is a meniscus lens having a negative power whose convex surface faces the object side, wherein conditions expressed by $-130 \leq f_2/fl \leq -6$ and $0.8 \leq f_1/fl \leq 1$ (where, fl: focal distance of the entire lens system, $f_1$: focal distance of the first lens, and $f_2$: focal distance of the second lens) are to be satisfied.

5 Claims, 31 Drawing Sheets

IMAGING LENS AND IMAGING DEVICE INCLUDING THE IMAGING LENS

BACKGROUND OF THE INVENTION

1. Field of the Invention

The present invention relates to an imaging lens and an imaging device including the imaging lens. In particular, the present invention relates to an imaging lens and an imaging device including the imaging lens, in which the imaging lens has a three-lens structure that is capable of size and weight reduction. The imaging lens is used in an image-taking device that uses an image sensor element, such as a charge-coupled device (CCD) and a complementary metal oxide semiconductor (CMOS), mounted on a portable computer, a television phone, a portable phone, and the like.

2. Description of the Related Art

In recent years, there has been an increasing demand for cameras that utilize an image sensor element, such as the CCD, the CMOS, or the like, that is mounted on a portable computer, a television phone, a portable phone, a digital camera, and the like. It is demanded that a camera such as this is small and light because the camera is required to be mounted on a limited installation space.

Therefore, it is also necessary for the imaging lens used in such cameras to be similarly small and light. Conventionally, a single-lens structure lens system using a single lens and a two-lens structure lens system having two lenses have been used as such an imaging lens.

However, although such lens systems with a small number of lenses are extremely effective in reducing the size and weight of the lens system, the lens systems cannot sufficiently handle high image quality and high resolution required of the imaging lenses in recent years.

Therefore, conventionally, a three-lens structure lens system using three lenses is used to handle high image quality and high resolution. The three lenses are a first lens, a second lens set on an object surface side of the first lens, and a third lens set on the object surface side of the second lens.

As examples of such a three-lens structure lens system attempting to increase resolution, for example, the lens systems described in the following Patent Literatures 1 to 3 are known.

[Patent Literature 1] Japanese Patent Unexamined Publication 2001-75006

[Patent Literature 2] Japanese Patent Unexamined Publication 2003-149545

[Patent Literature 3] Japanese Patent Unexamined Publication Heisei 10-301021

However, in the lens system described in Patent Literature 1, a diaphragm is disposed closest to the object side. Therefore, correction of distortion and chromatic aberration caused by magnification is difficult. A first lens is a meniscus lens whose convex surface faces an image surface side. Therefore, the lens system is not suitable for size and weight reduction. A second lens is shaped having a concave surface on the image surface side. Therefore, total reflection easily occurs and correction of off-axis aberration is difficult.

In the lens system described in Patent Literature 2, a first lens has negative power. Therefore, size and weight reduction is difficult.

Furthermore, in the lens system described in Patent Literature 3, a diaphragm is disposed between a second lens and a third lens. The third lens has a strong concave surface facing an object side and negative power. Therefore, telecentricity is poor. Moreover, an effective diameter of the third lens is large because space between the second lens and the third lens is wide. Therefore, the lens system is not suitable for size and weight reduction.

Therefore, the conventional lens systems were insufficient for securing telecentricity and achieving excellent resolution through sufficient correction of various aberrations, while achieving size and weight reduction.

SUMMARY OF THE INVENTION

The present invention has been achieved in light of the above-described problems. An object of the invention is to provide an imaging lens and an imaging device including the imaging lens, in which the imaging lens can secure telecentricity and achieve excellent resolution through sufficient correction of various aberrations, while being compact and light.

In order to achieve the aforementioned object, an imaging lens according to a first aspect of the present invention is an imaging lens used for forming an image of an object on an image-taking surface of an image sensor element comprising, in order from an object side to an image surface side: a first lens that is a meniscus lens having a positive power whose convex surface faces the object side, a diaphragm, a second lens that is a meniscus lens having a negative power whose convex surface faces the image surface side, and a third lens that is a meniscus lens having a negative power whose convex surface faces the object side, wherein conditions expressed by the following expressions (1) and (2) are to be satisfied:

$$-130 \leq f_2/fl \leq -6 \quad (1)$$

$$0.8 \leq f_1/fl \leq 1 \quad (2)$$

where, fl: focal distance of the entire lens system
$f_1$: focal distance of the first lens
$f_2$: focal distance of the second lens.

In the first aspect of the invention, the first lens is a meniscus lens having a positive power whose convex surface faces the object side. The second lens is a meniscus lens having a negative power whose convex surface faces the image surface side. The third lens is a meniscus lens having a negative power whose convex surface faces the object side. The diaphragm is disposed between the first lens and the second lens. In addition, the conditions expressed by the expressions (1) and (2) are satisfied. Therefore, the size of the optical system can be reduced, telecentricity can be secured, and various aberrations, such as coma aberration, chromatic aberration, and field curvature can be successfully corrected.

An imaging lens according to a second aspect is the imaging lens according to the first aspect, wherein, further, a condition expressed by a following expression (3) is to be satisfied:

$$10 \leq (r_5+r_6)/(r_5-r_6) \leq 25 \quad (3)$$

where, $r_5$: center radius curvature of the object side face of the third lens $r_6$: center radius curvature of the image surface side face of the third lens.

In the second aspect of the present invention, further, the expression (3) is satisfied. Therefore, telecentricity can be further enhanced and field curvature can be more successfully corrected.

An imaging lens according to a third aspect is the imaging lens according to the first aspect, wherein, further, a condition expressed by a following expression (4) is to be satisfied:

$$0.5 \leq r_5/fl \leq 1.1 \quad (4).$$

In the third aspect of the invention, further, the expression (4) is satisfied. Therefore, coma aberration and distortion can be more successfully corrected.

An imaging lens according to a fourth aspect is the imaging lens according to the first aspect, wherein, further, a condition expressed by a following expression (5) is to be satisfied:

$$0 < r_1/r_2 \leq 0.5 \quad (5)$$

where, $r_1$: center radius curvature of the object side face of the first lens $r_2$: center radius curvature of the image surface side face of the first lens.

In the fourth aspect of the present invention, further, the expression (5) is satisfied. Therefore, spherical aberration can be successfully corrected while reducing the size of the optical system.

An imaging device according to a fifth aspect includes the imaging lens according to any one of aspects 1 to 4 and an image sensor element.

In the fifth aspect of the present invention, further, a compact and light imaging device having high image quality can be achieved by an imaging lens that can reduce the size and weight of the optical system, secure telecentricity, and successfully correct various aberrations, such as coma aberration, chromatic aberration, and field curvature, being included.

EFFECT OF THE INVENTION

In the imaging lens and the imaging device including the imaging lens of the invention, telecentricity can be secured and excellent resolution can be achieved through sufficient correction of various aberrations, while being compact and light.

In particular, a high-performance imaging lens that is compact and has a short optical length can be actualized.

DETAILED DESCRIPTION OF THE PREFERRED EMBODIMENT

An embodiment of the imaging lens and the imaging device including the imaging lens according to the present invention will be described hereinafter with reference to FIG. 1.

Figure 1:
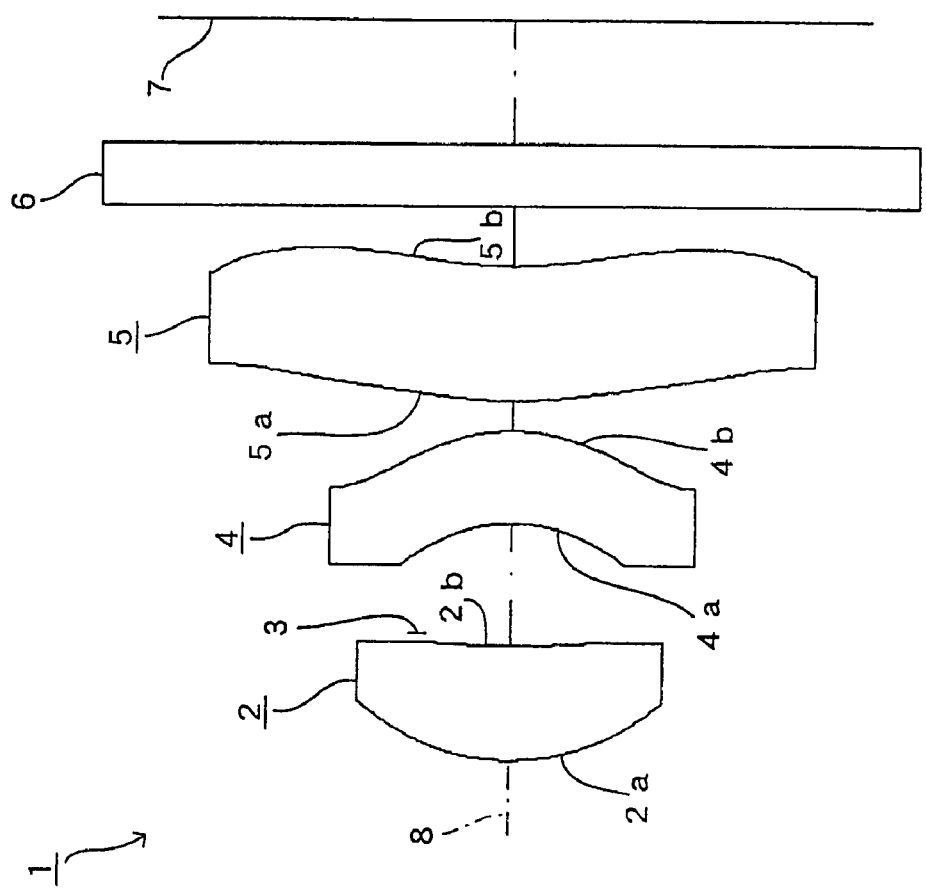
FIG. 1 is a schematic diagram for showing an embodiment of an imaging lens and an imaging device including the imaging lens according to the present invention.

As shown in FIG. 1, an imaging lens 1 according to the embodiment comprises, in order from the object side toward the image surface side, a first lens 2 that is a meniscus lens having a positive power whose convex surface faces the object side, a diaphragm 3, a second lens 4 that is a meniscus lens having a negative power whose convex surface faces the image surface side, and a third lens 5 that is a meniscus lens having a negative power whose convex surface faces the object side. Each lens 2, lens 4, and lens 5 are formed at a low cost using an injection-molding method using resin material.

Hereafter, respective lens surfaces 2a, 4a, and 5a on the object side of the first lens 2, the second lens 4, and the third lens 5 are referred to as first face 2a, first face 4a, and first face 5a of each lens 2, lens 4, and lens 5. Respective lens surfaces 2b, 4b, and 5b on the image surface side of the first lens 2, the second lens 4, and the third lens 5 are referred to as second face 2b, second face 4b, and second face 5b of each lens 2, lens 4, and lens 5.

On the image surface side the third lens 5, there are respectively disposed various filters 6, such as a cover glass, an infrared (IR) cut filter, and a lowpass filter, and an image-taking surface 7 that is a light-receiving surface of an image sensor element (solid image sensor element), such as a CCD or a CMOS. The imaging device is composed of the image sensor element, the lens 2, the lens 4, the lens 5, and the diaphragm 3. The various filters 6 may be omitted as required.

In this way, according to the embodiment, the first lens 2 is a meniscus lens having a positive power whose convex surface faces the object side. Therefore, the optical system can be made compact. In addition, the imaging lens 1 and the imaging device can be made compact and light.

According to the embodiment, the diaphragm 3 is disposed between the first lens 2 and the second lens 4. The diaphragm 3 can be disposed in a position away from the image surface. Therefore, telecentricity can be secured and, compared to when the diaphragm 3 is disposed on the object side of the first lens 2, distortion can be successfully corrected.

According to the embodiment, the second lens 4 is a meniscus lens having a negative power whose convex surface faces the image surface side. Therefore, coma aberration, field curvature and the like can be successfully corrected. When the first face 4a and the second face 4b of the second lens 4 are aspheric surfaces, the effect of aberration correction can be enhanced.

According to the embodiment, the third lens 5 is a meniscus lens having a negative power whose convex surface faces the object side. Therefore, telecentricity can be secured. When the second face 5b of the third lens 5 is an aspheric surface, aberrations at each image height can be effectively corrected. In other words, each light beam incident on the optical system from each object point on an object plane is separated by image height after passing through the diaphragm 3. When the third lens 5 is a lens of which the convex surface faces the object side, each light beam incident on the first face 5a of the third lens 5 after passing through the diaphragm 3 can be more effectively separated by the first face 5a. The aberrations (particularly the astigmatism) of each light beam separated by image height can be effectively corrected by each light beam, by the second face 5b of the third lens 5 that is an aspheric surface.

In addition to such a configuration, according to the embodiment, conditions expressed by the following expressions (1) and (2) are satisfied:

$$-130 \leq f_2/fl \leq -6 \quad (1)$$

$$0.8 \leq f_1/fl \leq 1 \quad (2)$$

where, fl in the expression (1) is the focal distance of the entire lens system (the same applies hereafter). $f_2$ in the expression (1) is the focal distance of the second lens 4 (the same applies hereafter). $f_1$ in the expression (2) is the focal distance of the first lens 2 (the same applies hereafter).

When the value of $f_2/fl$ is greater than the value (−6) in the expression (1), the negative power of the second lens 4 becomes too strong. Coma aberration worsens and Petzval sum becomes excessively corrected. At the same time, when the value of $f_2/fl$ is less than the value (−130) in the expression (1), the negative power of the second lens 4 becomes too weak. Telecentricity deteriorates and chromatic aberration is insufficiently corrected.

Therefore, according to the embodiment, by the value of $f_2/fl$ being set to satisfy the expression (1), telecentricity can be further enhanced. Various aberrations, such as coma aberration, chromatic aberration, and field curvature, can be more successfully corrected.

The relationship between $f_2$ and fl is more preferably $-80 \leq f_2/fl \leq -6$.

When the value of $f_1/fl$ is greater than the value (1) in the expression (2), the power of the first lens 2 becomes too weak. Size reduction of the optical system becomes difficult. At the same time, when the value of $f_1/fl$ is less than the value (0.8) in the expression (2), the power of the first lens 2 becomes too strong. Aberration correction becomes difficult.

Therefore, according to the embodiment, by the value of $f_1/fl$ being set to satisfy the expression (2), telecentricity can be further enhanced. Both size reduction (in other words, the size and weight reduction of the imaging lens 1 and the imaging device) and enhanced performance of the optical system can be achieved.

The relationship between $f_1$ and fl is more preferably $0.8 \leq f_1/fl \leq 0.93$.

In addition to the above-described configuration, according to the embodiment, a condition expressed by a following expression (3) is satisfied:

$$10 \leq (r_5+r_6)/(r_5-r_6) \leq 25 \quad (3)$$

where, $r_5$ in the expression (3) is the center radius curvature of the first face 5a of the third lens 5 (the same applies hereafter). $r_6$ in the expression (3) is the center radius curvature of the second face 5b of the third lens 5 (the same applies hereafter).

When the value of $(r_5+r_6)/(r_5-r_6)$ is greater than the value (25) in the expression (3), although telecentricity is advantageously affected, the correction of field curvature becomes difficult. At the same time, when the value of $(r_5+r_6)/(r_5-r_6)$ is less than the value (10) in the expression (3), telecentricity deteriorates and the correction of field curvature becomes difficult.

Therefore, according to the embodiment, by the value of $(r_5+r_6)/(r_5-r_6)$ being set to satisfy the expression (3), telecentricity can be further enhanced and field curvature can be more successfully corrected.

The value of $(r_5+r_6)/(r_5-r_6)$ is more preferably $12 \leq (r_5+r_6)/(r_5-r_6) \leq 20$.

In addition to the above-described configuration, according to the embodiment, a condition expressed by a following expression (4) is satisfied:

$$0.5 \leq r_5/fl \leq 1.1 \quad (4)$$

When the value of $r_5/fl$ is greater than the value (1.1) in the expression (4), the correction of coma aberration becomes difficult. At the same time, when the value of $r_5/fl$ is less than the value (0.5) in the expression (4), distortion deteriorates.

Therefore, according to the embodiment, by the value of $r_5/fl$ being set to satisfy the expression (4), coma aberration and distortion can be more successfully corrected.

The relationship between $r_5$ and fl is more preferably $0.6 \leq r_5/fl \leq 0.9$.

In addition to the above-described configuration, according to the embodiment, a condition expressed by a following expression (5) is satisfied:

$$0 < r_1/r_2 \leq 0.5 \quad (5)$$

where, $r_1$ in the expression (5) is the center radius curvature of the first face 2a of the first lens 2 (the same applies hereafter) $r_2$ in the expression (5) is the center radius curvature of the second face 2b of the first lens (the same applies hereafter).

When the value of $r_1/r_2$ is greater than the value (0.5) in the expression (5), the spherical aberration of the second face 2b of the first lens 2 increases and the size reduction of the optical system becomes difficult. At the same time, when the value of $r_1/r_2$ is the value (0) in the expression (5) or less, the spherical aberration of the first face 2a of the first lens 2 increases.

Therefore, according to the embodiment, by the value of $r_1/r_2$ being set to satisfy the expression (5), spherical aberration can be successfully corrected while reducing the size of the optical system.

The relationship between $r_1$ and $r_2$ is more preferably $0.1 \leq r_1/r_2 \leq 0.41$.

EXAMPLES

Next, EXAMPLES of the present invention will be described with reference to FIG. 2 to FIG. 31.

In the EXAMPLES, F no denotes F number, ω denotes half of the angle-of-view (angle of view of opposing angles), and r denotes the radius curvature of an optical surface (center radius curvature of a lens surface). Further, d denotes a distance to the next optical surface, nd denotes the index of refraction of each optical system when the d line (yellow) is irradiated, and vd denotes the Abbe number of each optical system also when the d line is irradiated.

k, A, B, C, and D denote each coefficient in a following expression (6). Specifically, the shape of the aspherical surface of the lens is expressed by the following expression provided that the direction of the optical axis 8 is taken as the Z axis, the direction orthogonal to the optical axis 8 (height direction) as the X axis, the traveling direction of light is positive, k is the constant of cone, A, B, C, and D are the aspherical coefficients, and r is the center radius curvature.

$$Z(X) = r^{-1}X^2/[1+\{1-(k+1)r^{-2}X^2\}^{1/2}]+AX^4+BX^6+CX^8+DX^{10} \quad (6)$$

In the following EXAMPLES, reference code E used for a numerical value denoting the constant of cone and the aspherical coefficient indicates that the numerical value following E is an exponent having 10 as the base and that the numerical value before E is multiplied by the numerical value denoted by the exponent having 10 as the base. For example, 5.4E-1 denotes $5.4 \times 10^{-1}$.

First Example

Figure 2:
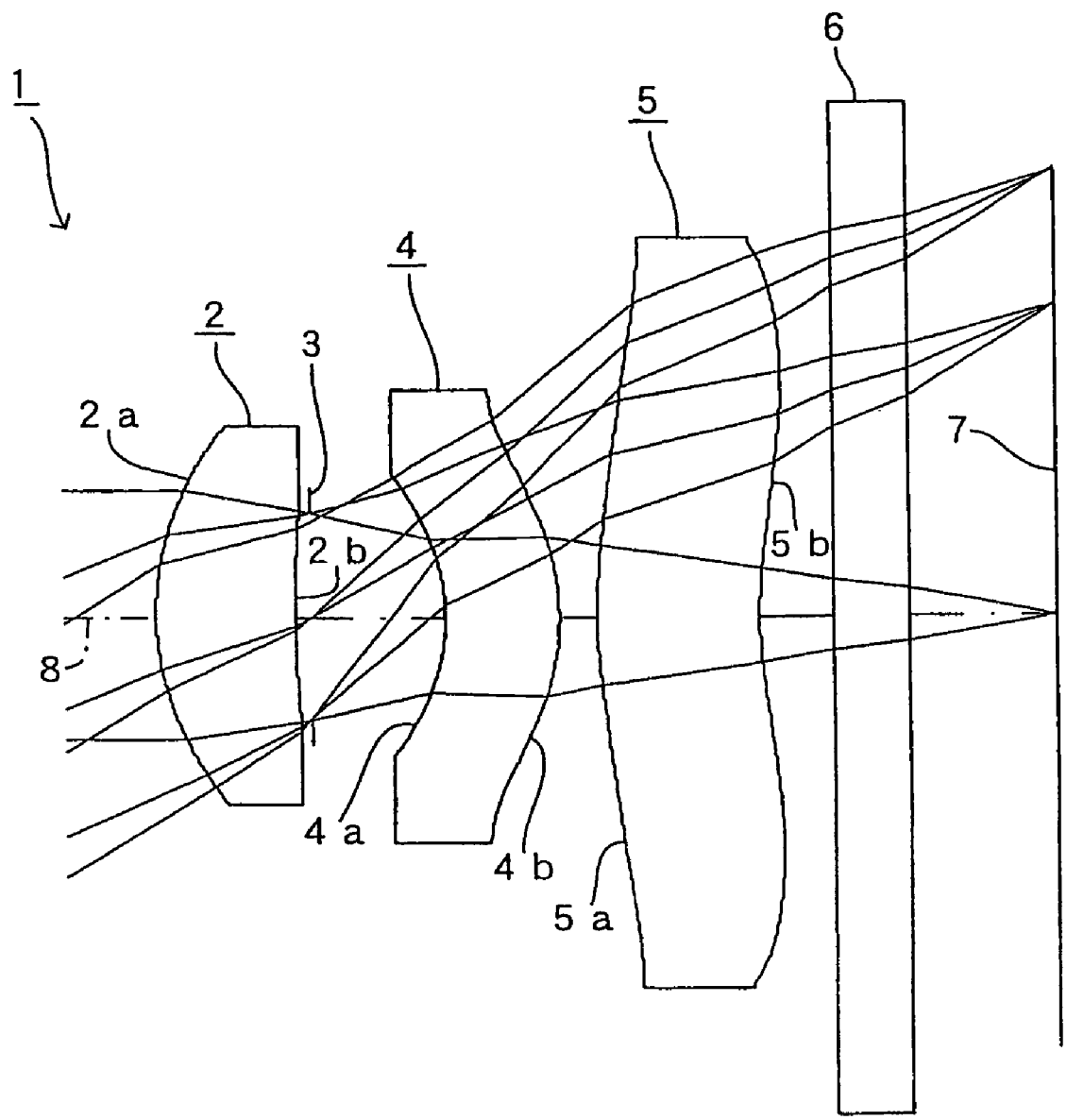
FIG. 2 is a schematic diagram for showing a FIRST EXAMPLE of the imaging lens according to the present invention.

FIG. 2 shows a FIRST EXAMPLE of the present invention. The imaging lens 1 according to the FIRST EXAMPLE shown in FIG. 2 is the same imaging lens 1 as that shown in FIG. 1. In the example, a cover glass serving as the filter 6 is disposed between the second face 5b of the third lens 5 and the image-taking surface 7.

The imaging lens 1 of the FIRST EXAMPLE was set under the following conditions:

| Lens Data fl = 2.91 mm, $f_1$ = 2.65 mm, $f_2$ = −126.03 mm, F no = 2.8, ω = 63.2° | | | | |
|---|---|---|---|---|
| Face Number | r | d | nd | vd |
| (Object Point) | | | | |
| 1(First Face of First Lens) | 1.15 | 0.56 | 1.5310 | 56 |
| 2(Second Face of First Lens) | 5.27 | 0.06 | | |
| 3(Diaphragm) | 0.00 | 0.55 | | |
| 4(First Face of Second Lens) | −0.79 | 0.46 | 1.5850 | 30 |
| 5(Second Face of Second Lens) | −0.97 | 0.15 | | |
| 6(First Face of Third Lens) | 2.08 | 0.66 | 1.5310 | 56 |
| 7(Second Face of Third Lens) | 1.84 | 0.30 | | |
| 8(First Face of Cover Glass) | 0.00 | 0.30 | 1.5168 | 64 |
| 9(Second Face of Cover Glass) | 0.00 | | | |
| (Image Surface) | | | | |

| Face Number | k | A | B | C | D |
|---|---|---|---|---|---|
| 1 | −7.2 | 5.4E−1 | −7.2E−1 | 9.1E−1 | −5.9E−1 |
| 2 | 0 | −8.9E−3 | −3.7E−2 | −4.0E−1 | 5.8E−1 |
| 4 | −3.0E−1 | 2.0E−1 | −9.0E−1 | 4.0 | −5.7 |
| 5 | −1.0 | −6.8E−2 | 2.4E−1 | 3.2E−1 | −2.8E−1 |
| 6 | −2.6E+1 | −6.9E−2 | 8.2E−2 | −3.6E−2 | 5.1E−3 |
| 7 | −1.4E+1 | −1.0E−1 | 2.7E−2 | −7.9E−4 | −1.6E−3 |

Under such conditions, $f_2/fl=-43$ was achieved, thereby satisfying the expression (1). $f_1/fl=0.91$ was achieved, thereby satisfying the expression (2). $(r_5+r_6)/(r_5-r_6)=17$ was achieved, thereby satisfying the expression (3). $r_5/fl=0.71$ was achieved, thereby satisfying the expression (4). $r_1/r_2=0.22$ was achieved, thereby satisfying the expression (5).

Figure 3:
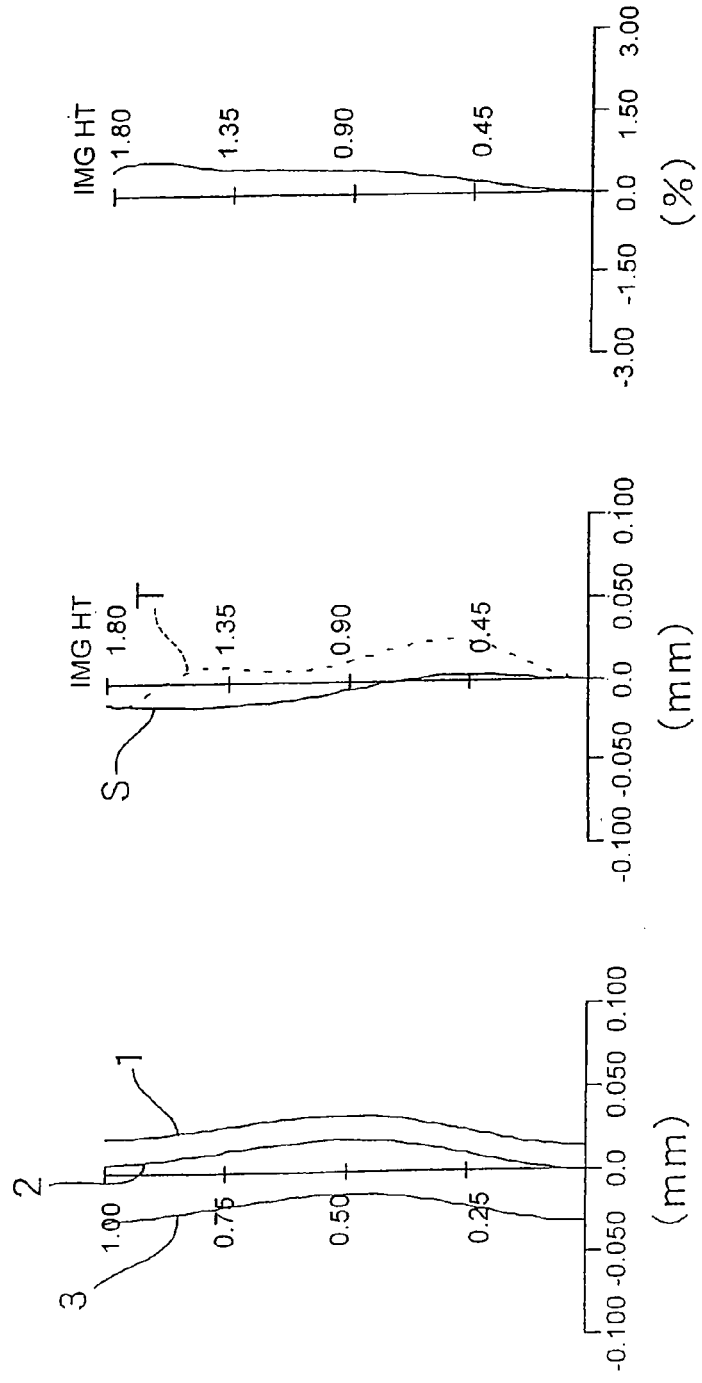
FIG. 3 shows graphs for describing the spherical aberration, astigmatism, and distortion of the imaging lens shown in FIG. 2.

FIG. 3 shows the spherical aberration, the astigmatism and the distortion in the imaging lens 1 of the FIRST EXAMPLE.

According to the result, each of the spherical aberration, the astigmatism, and the distortion was almost satisfied. It can be seen from the result that a sufficiently excellent optical property can be obtained.

Second Example

Figure 4:
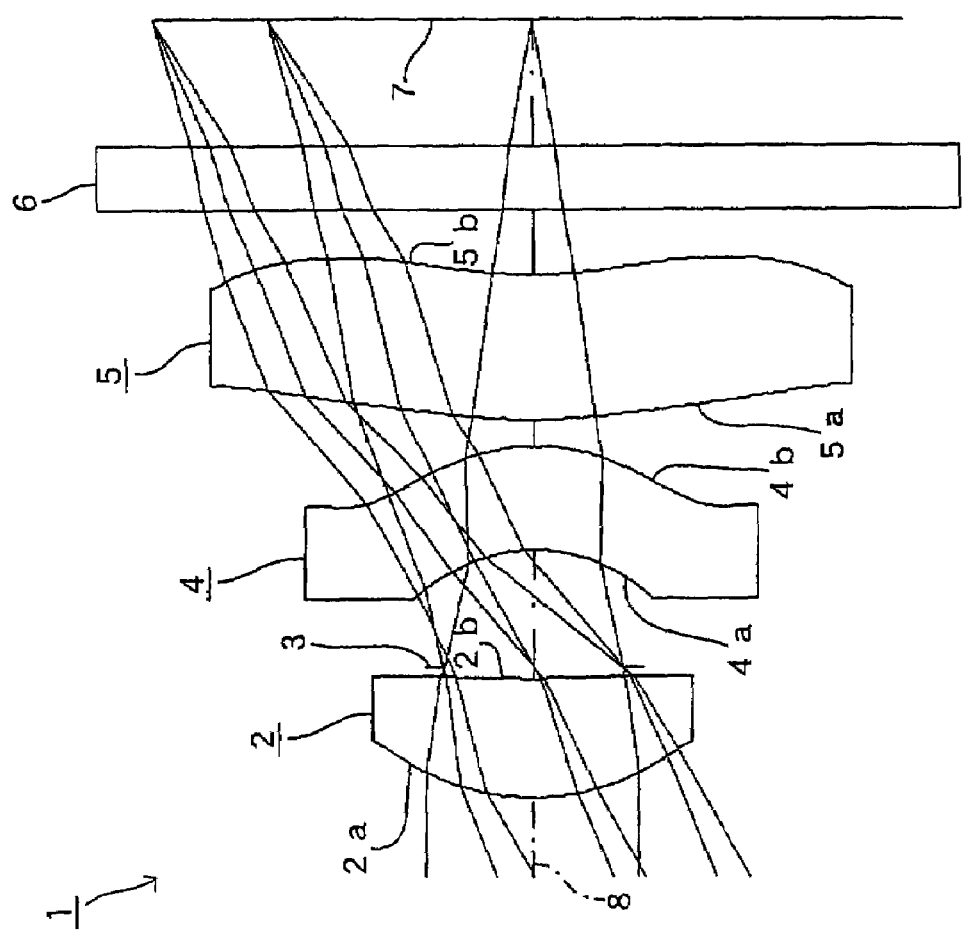
FIG. 4 is a schematic diagram for showing a SECOND EXAMPLE of the imaging lens according to the present invention.

FIG. 4 shows a SECOND EXAMPLE of the present invention. In the example, as in the FIRST EXAMPLE, a cover glass serving as the filter 6 is disposed between the second face 5b of the third lens 5 and the image-taking surface 7.

The imaging lens 1 of the SECOND EXAMPLE was set under the following conditions:

Lens Data
fl = 2.91 mm, $f_1$ = 2.55 mm, $f_2$ = −132.26 mm, F no = 2.8, ω = 62.9°

| Face Number | r | d | nd | νd |
|---|---|---|---|---|
| (Object Point) | | | | |
| 1(First Face of First Lens) | 1.16 | 0.55 | 1.5310 | 56 |
| 2(Second Face of First Lens) | 6.64 | 0.06 | | |
| 3(Diaphragm) | 0.00 | 0.55 | | |
| 4(First Face of Second Lens) | −0.76 | 0.49 | 1.5850 | 30 |
| 5(Second Face of Second Lens) | −0.95 | 0.13 | | |
| 6(First Face of Third Lens) | 2.33 | 0.68 | 1.5310 | 56 |
| 7(Second Face of Third Lens) | 1.99 | 0.30 | | |
| 8(First Face of Cover Glass) | 0.00 | 0.30 | 1.5168 | 64 |
| 9(Second Face of Cover Glass) (Image Surface) | 0.00 | | | |

| Face Number | k | A | B | C | D |
|---|---|---|---|---|---|
| 1 | −7.0 | 5.2E−1 | −7.3E−1 | 9.2E−1 | −7.6E−1 |
| 2 | 0 | −4.3E−2 | −1.1E−1 | −5.2E−1 | 9.8E−1 |
| 4 | −2.5E−1 | 1.5E−1 | −7.8E−1 | 4.1 | −6.4 |
| 5 | −1.0 | −7.1E−2 | 2.5E−1 | 3.4E−1 | −2.9E−1 |
| 6 | −3.5E+1 | −6.5E−2 | 8.1E−2 | −3.6E−2 | 5.4E−3 |
| 7 | −1.5E+1 | −1.0E−1 | 2.5E−2 | −5.4E−4 | −1.5E−3 |

Under such conditions, $f_2/fl = -45$ was achieved, thereby satisfying the expression (1). $f_1/fl = 0.88$ was achieved, thereby satisfying the expression (2). $(r_5+r_6)/(r_5-r_6) = 13$ was achieved, thereby satisfying the expression (3). $r_5/fl = 0.80$ was achieved, thereby satisfying the expression (4). $r_1/r_2 = 0.17$ was achieved, thereby satisfying the expression (5).

Figure 5:
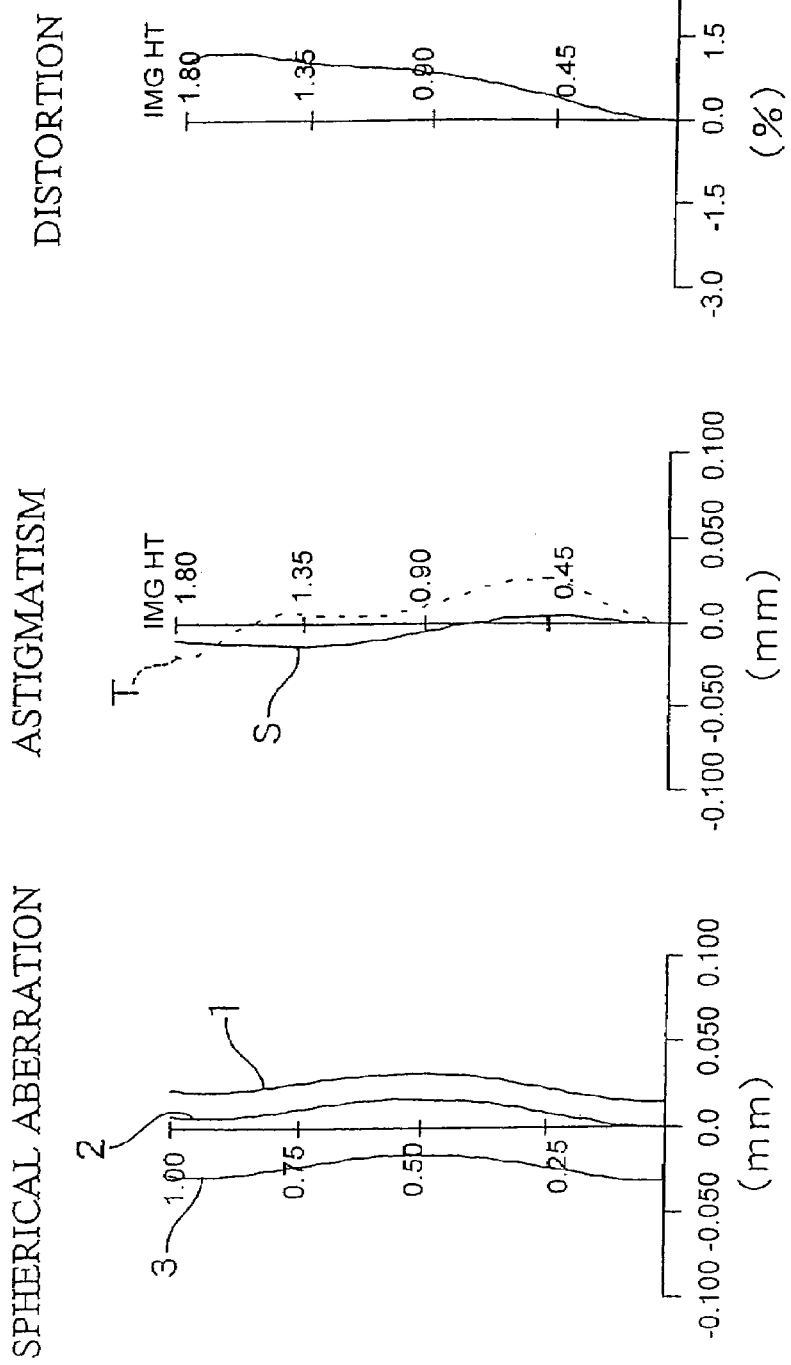
FIG. 5 shows graphs for describing the spherical aberration, astigmatism, and distortion of the imaging lens shown in FIG. 4.

FIG. 5 shows the spherical aberration, the astigmatism and the distortion in the imaging lens 1 of the SECOND EXAMPLE.

According to the result, each of the spherical aberration, the astigmatism, and the distortion was almost satisfied. It can be seen from the result that a sufficiently excellent optical property can be obtained.

Third Example

Figure 6:
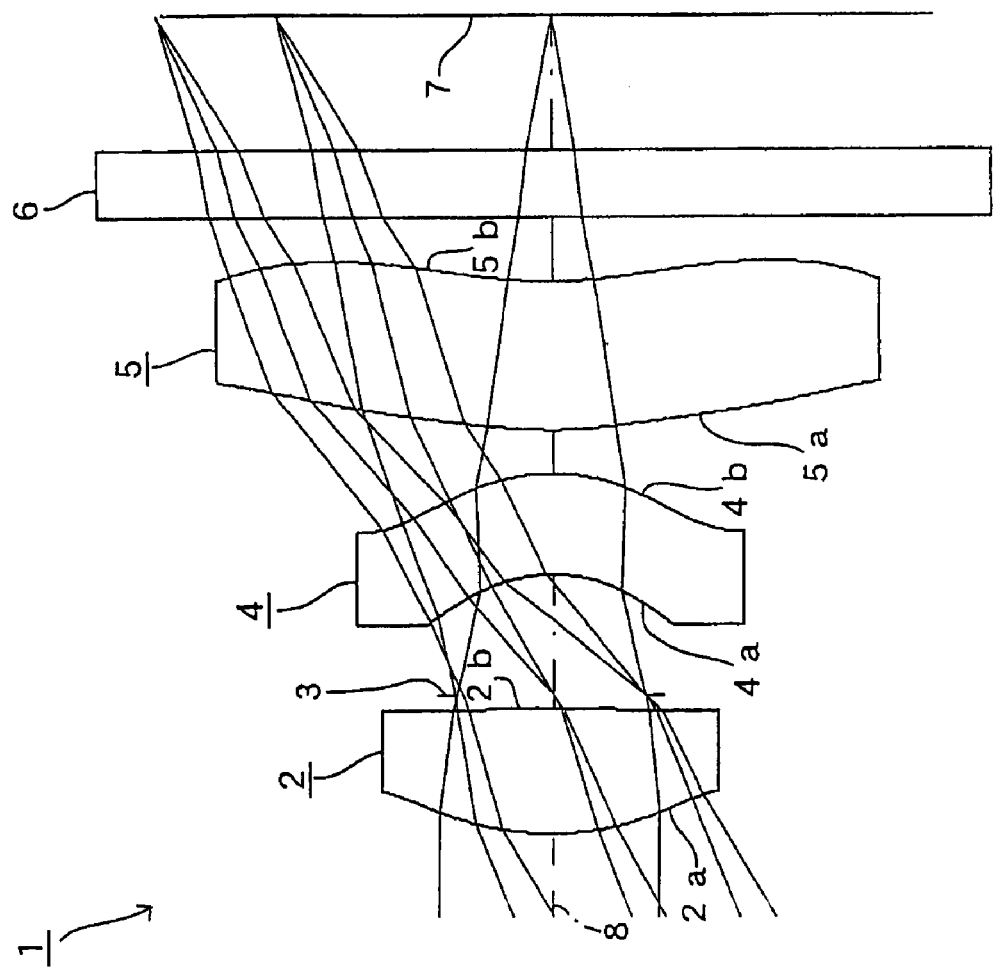
FIG. 6 is a schematic diagram for showing a THIRD EXAMPLE of the imaging lens according to the present invention.

FIG. 6 shows a THIRD EXAMPLE of the present invention. In the example, as in the FIRST EXAMPLE, a cover glass serving as the filter 6 is disposed between the second face 5b of the third lens 5 and the image-taking surface 7.

The imaging lens 1 of the THIRD EXAMPLE was set under the following conditions:

Lens Data
fl = 2.91 mm, $f_1$ = 2.53 mm, $f_2$ = −151.54 mm, F no = 2.8, ω = 62.9°

| Face Number | r | d | nd | νd |
|---|---|---|---|---|
| (Object Point) | | | | |
| 1(First Face of First Lens) | 1.33 | 0.56 | 1.5310 | 56 |
| 2(Second Face of First Lens) | 164.09 | 0.06 | | |
| 3(Diaphragm) | 0.00 | 0.55 | | |
| 4(First Face of Second Lens) | −0.71 | 0.45 | 1.5850 | 30 |
| 5(Second Face of Second Lens) | −0.88 | 0.20 | | |
| 6(First Face of Third Lens) | 2.35 | 0.68 | 1.5310 | 56 |
| 7(Second Face of Third Lens) | 1.95 | 0.30 | | |
| 8(First Face of Cover Glass) | 0.000 | 0.30 | 1.5168 | 64 |
| 9(Second Face of Cover Glass) (Image Surface) | 0.000 | | | |

-continued

Lens Data
fl = 2.91 mm, $f_1$ = 2.53 mm, $f_2$ = −151.54 mm, F no = 2.8, ω = 62.9°

| Face Number | k | A | B | C | D |
|---|---|---|---|---|---|
| 1 | −8.8 | 4.1E−1 | −7.1E−1 | 8.0E−1 | −7.6E−1 |
| 2 | 0 | −1.0E−1 | −2.8E−1 | 2.3E−1 | −2.8E−1 |
| 4 | −3.6E−1 | 1.5E−1 | −1.2E−1 | 3.6 | −5.6 |
| 5 | −1.2 | −5.0E−2 | 1.5E−1 | 8.5E−1 | −7.1E−1 |
| 6 | −2.7E+1 | −4.5E−2 | 5.8E−2 | −2.4E−2 | 3.2E−3 |
| 7 | −1.3E+1 | −9.4E−2 | 2.8E−2 | −3.5E−3 | −6.3E−4 |

Under such conditions, $f_2/fl = -52$ was achieved, thereby satisfying the expression (1). $f_1/fl = 0.87$ was achieved, thereby satisfying the expression (2). $(r_5+r_6)/(r_5-r_6) = 11$ was achieved, thereby satisfying the expression (3) $r_5/fl = 0.81$ was achieved, thereby satisfying the expression (4). $r_1/r_2 = 0.01$ was achieved, thereby satisfying the expression (5).

Figure 7:
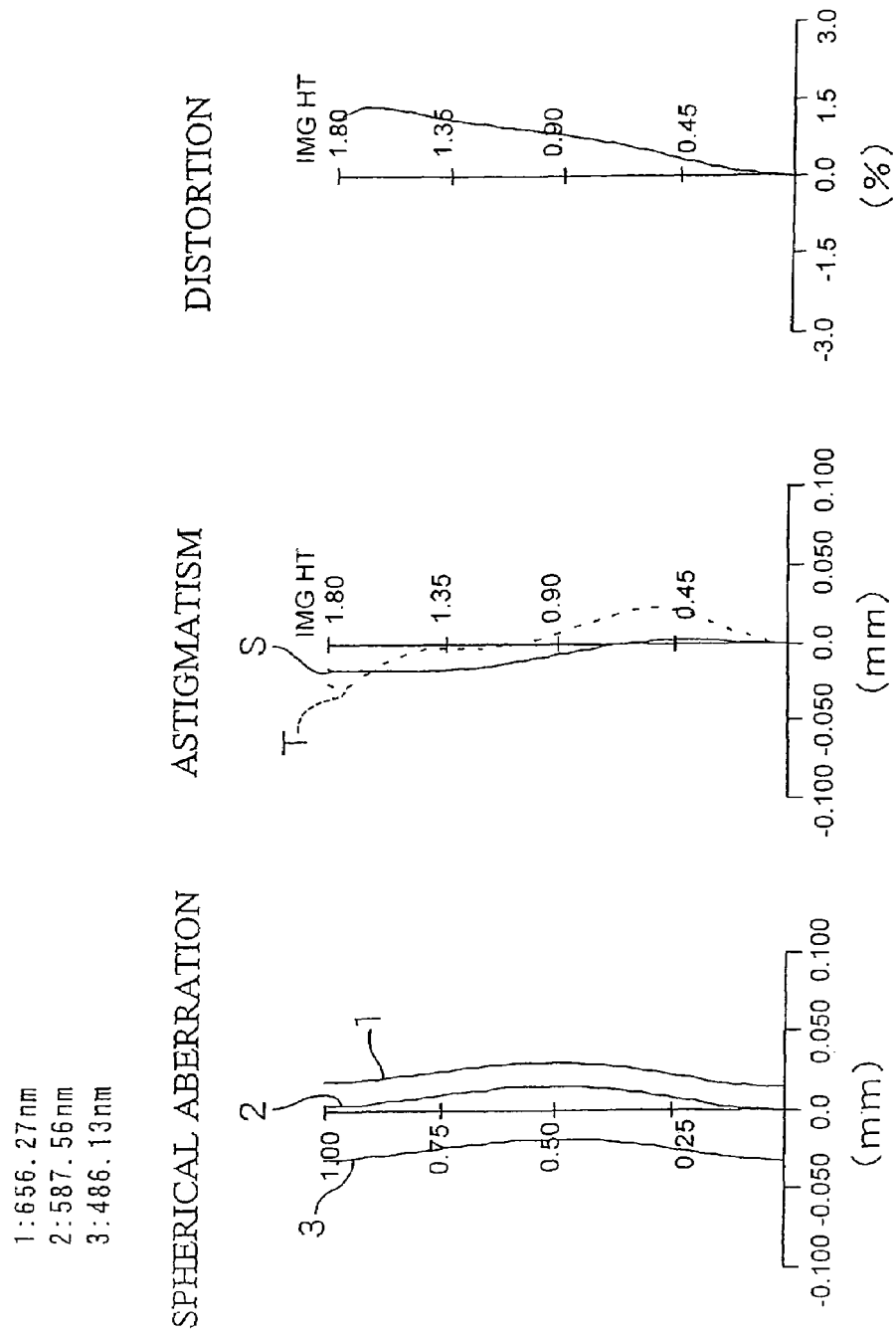
FIG. 7 shows graphs for describing the spherical aberration, astigmatism, and distortion of the imaging lens shown in FIG. 6.

FIG. 7 shows the spherical aberration, the astigmatism and the distortion in the imaging lens 1 of the THIRD EXAMPLE.

According to the result, each of the spherical aberration, the astigmatism, and the distortion was almost satisfied. It can be seen from the result that a sufficiently excellent optical property can be obtained.

Fourth Example

Figure 8:
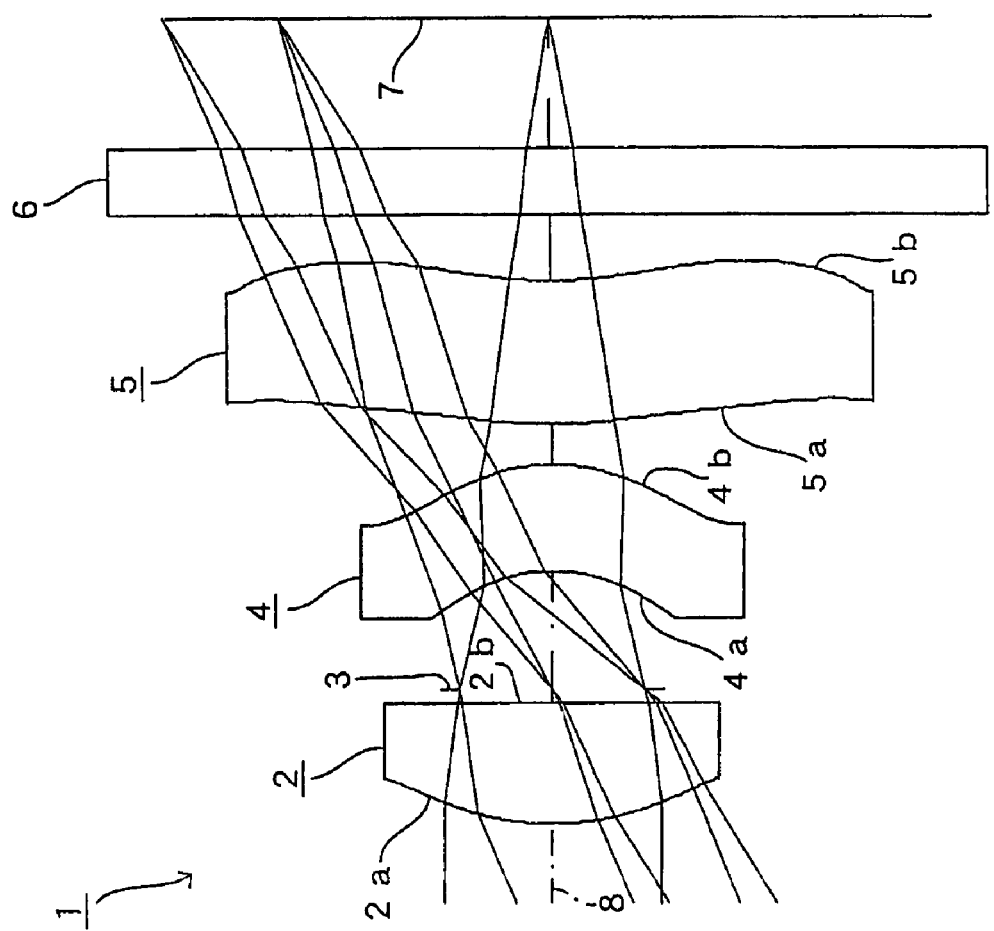
FIG. 8 is a schematic diagram for showing a FOURTH EXAMPLE of the imaging lens according to the present invention.

FIG. 8 shows a FOURTH EXAMPLE of the present invention. In the example, as in the FIRST EXAMPLE, a cover glass serving as the filter 6 is disposed between the second face 5b of the third lens 5 and the image-taking surface 7.

The imaging lens 1 of the FOURTH EXAMPLE was set under the following conditions:

Lens Data
fl = 2.91 mm, $f_1$ = 2.54 mm, $f_2$ = −166.95 mm, F no = 2.8, ω = 63.0°

| Face Number | r | d | nd | νd |
|---|---|---|---|---|
| (Object Point) | | | | |
| 1(First Face of First Lens) | 1.30 | 0.56 | 1.5310 | 56 |
| 2(Second Face of First Lens) | 28.17 | 0.06 | | |
| 3(Diaphragm) | 0.00 | 0.55 | | |
| 4(First Face of Second Lens) | −0.75 | 0.48 | 1.5850 | 30 |
| 5(Second Face of Second Lens) | −0.94 | 0.19 | | |
| 6(First Face of Third Lens) | 2.23 | 0.66 | 1.5310 | 56 |
| 7(Second Face of Third Lens) | 1.84 | 0.30 | | |
| 8(First Face of Cover Glass) | 0.000 | 0.30 | 1.5168 | 64 |
| 9(Second Face of Cover Glass) (Image Surface) | 0.000 | | | |

| Face Number | k | A | B | C | D |
|---|---|---|---|---|---|
| 1 | −8.5 | 4.4E−1 | −7.4E−1 | 8.9E−1 | −8.1E−1 |
| 2 | 0 | −9.3E−2 | −2.0E−1 | −2.5E−2 | 2.3E−2 |
| 4 | −3.9E−1 | 6.3E−2 | −3.3E−1 | 3.6 | −5.4 |
| 5 | −8.8E−1 | −8.6E−2 | 2.5E−1 | 6.1E−1 | −5.0E−1 |
| 6 | −2.6E+1 | −1.2E−1 | 1.3E−1 | −6.5E−2 | 1.0E−2 |
| 7 | −1.1E+1 | −1.2E−1 | 3.9E−2 | −4.4E−3 | −1.5E−3 |

Under such conditions, $f_2/fl = -57$ was achieved, thereby satisfying the expression (1). $f_1/fl = 0.87$ was achieved, thereby satisfying the expression (2). $(r_5+r_6)/(r_5-r_6) = 11$ was achieved, thereby satisfying the expression (3). $r_5/fl = 0.76$ was achieved, thereby satisfying the expression (4). $r_1/r_2=0.05$ was achieved, thereby satisfying the expression (5).

Figure 9:
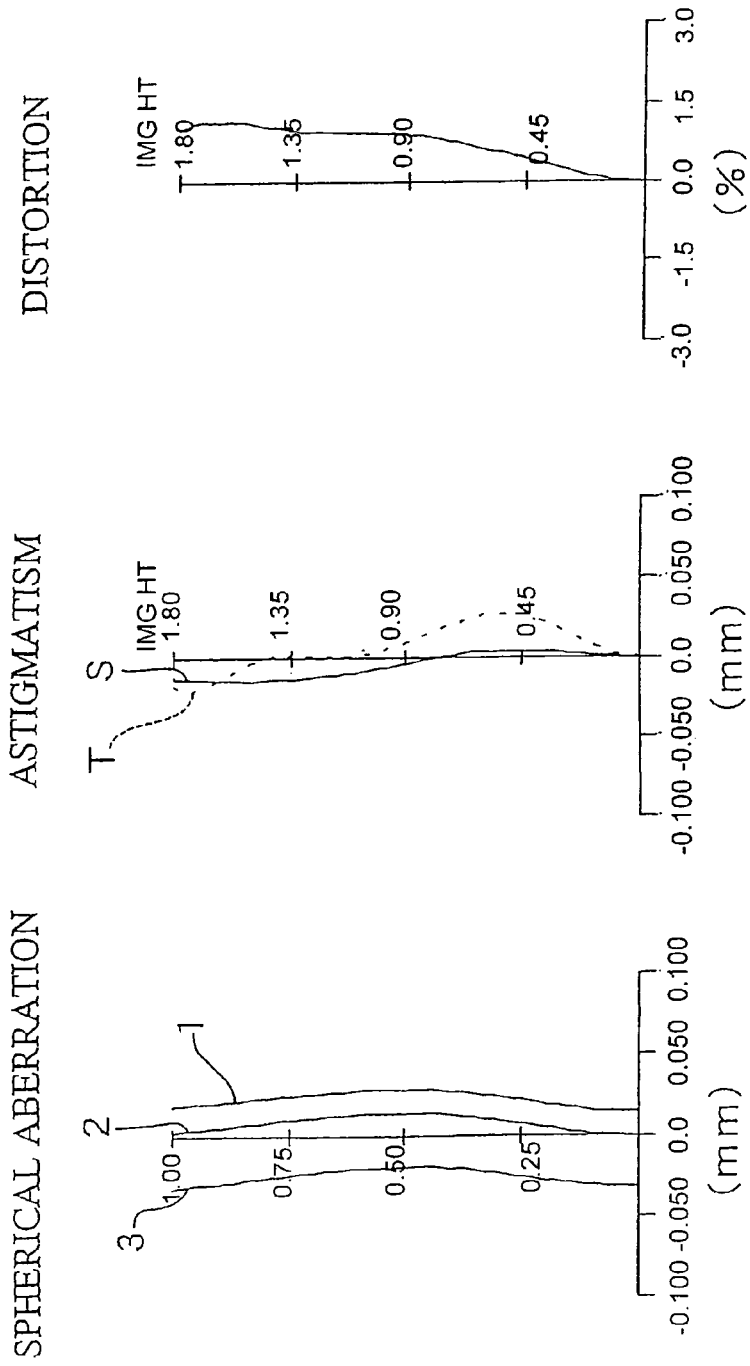
FIG. 9 shows graphs for describing the spherical aberration, astigmatism, and distortion of the imaging lens shown in FIG. 8.

FIG. 9 shows the spherical aberration, the astigmatism and the distortion in the imaging lens 1 of the FOURTH EXAMPLE.

According to the result, each of the spherical aberration, the astigmatism, and the distortion was almost satisfied. It can be seen from the result that a sufficiently excellent optical property can be obtained.

Fifth Example

Figure 10:
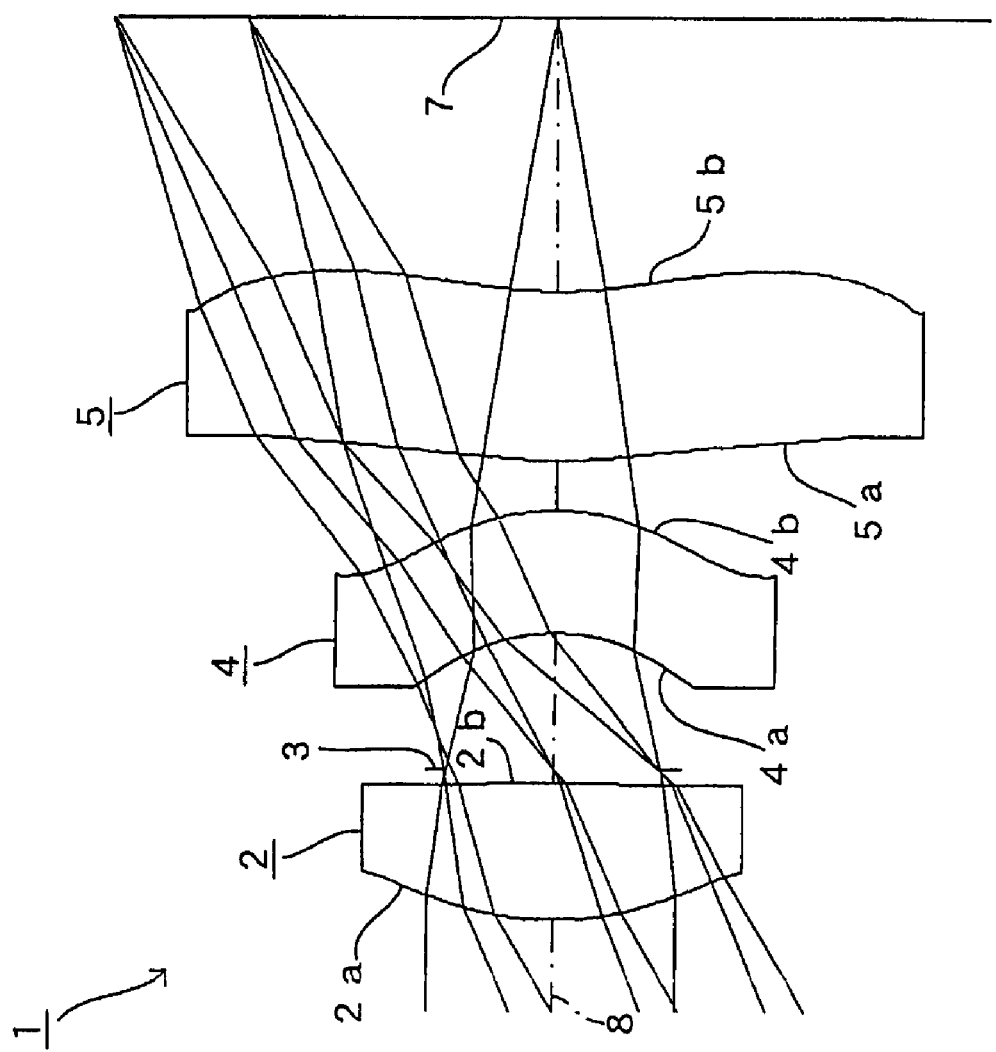
FIG. 10 is a schematic diagram for showing a FIFTH EXAMPLE of the imaging lens according to the present invention.

FIG. 10 shows a FIFTH EXAMPLE of the present invention. The example differs from the FIRST EXAMPLE to FOURTH EXAMPLE in that a cover glass serving as the filter 6 is not disposed between the second face 5b of the third lens 5 and the image-taking surface 7.

The imaging lens 1 of the FIFTH EXAMPLE was set under the following conditions:

Lens Data
fl = 2.90 mm, $f_1$ = 2.54 mm, $f_2$ = −249.99 mm, F no = 2.8, ω = 63.1°

| Face Number | r | d | nd | vd |
|---|---|---|---|---|
| (Object Point) | | | | |
| 1(First Face of First Lens) | 1.33 | 0.54 | 1.5310 | 56 |
| 2(Second Face of First Lens) | 85.90 | 0.06 | | |
| 3(Diaphragm) | 0.00 | 0.55 | | |
| 4(First Face of Second Lens) | −0.76 | 0.49 | 1.5850 | 30 |
| 5(Second Face of Second Lens) | −0.94 | 0.20 | | |
| 6(First Face of Third Lens) | 2.29 | 0.68 | 1.5310 | 56 |
| 7(Second Face of Third Lens) | 1.84 | 0.30 | | |
| (Image Surface) | | | | |

| Face Number | k | A | B | C | D |
|---|---|---|---|---|---|
| 1 | −9.3 | 4.3E−1 | −7.6E−1 | 8.6E−1 | −8.0E−1 |
| 2 | 0 | −9.5E−2 | −2.4E−1 | 5.9E−2 | 7.3E−3 |
| 4 | −4.0E−1 | 5.4E−2 | −2.0E−1 | 3.5 | −5.5 |
| 5 | −8.9E−1 | −8.7E−2 | 2.8E−1 | 6.4E−1 | −5.5E−1 |
| 6 | −3.2E+1 | −1.2E−1 | 1.3E−1 | −6.5E−2 | 1.0E−2 |
| 7 | −1.3E+1 | −1.2E−1 | 3.6E−2 | −4.1E−3 | −1.3E−3 |

Under such conditions, $f_2/fl=-86$ was achieved, thereby satisfying the expression (1). $f_1/fl=0.87$ was achieved, thereby satisfying the expression (2). $(r_5+r_6)/(r_5-r_6)=10$ was achieved, thereby satisfying the expression (3) $r_5/fl=0.79$ was achieved, thereby satisfying the expression (4). $r_1/r_2=0.02$ was achieved, thereby satisfying the expression (5).

Figure 11:
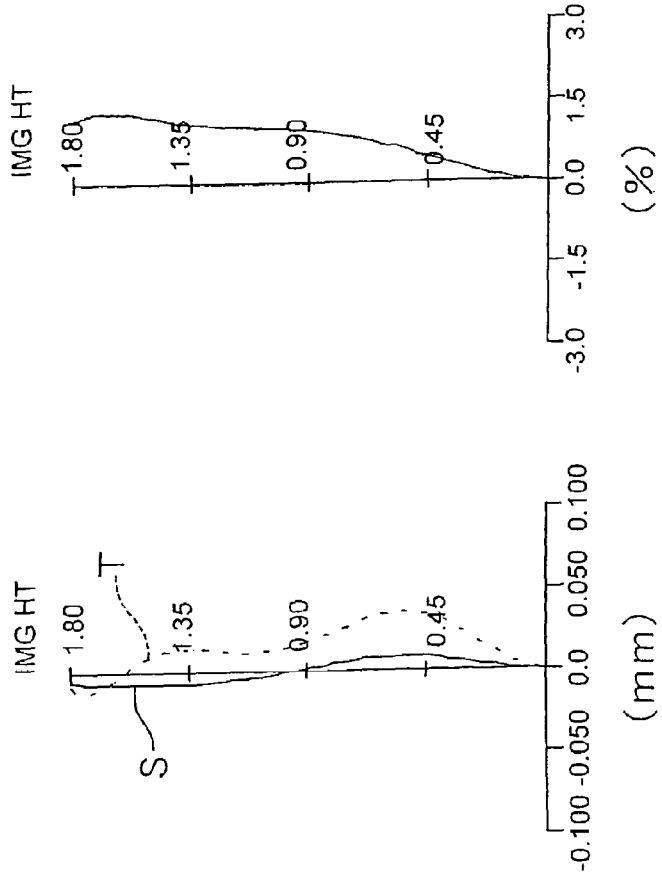
FIG. 11 shows graphs for describing the spherical aberration, astigmatism, and distortion of the imaging lens shown in FIG. 10.

FIG. 11 shows the spherical aberration, the astigmatism and the distortion in the imaging lens 1 of the FIFTH EXAMPLE.

According to the result, each of the spherical aberration, the astigmatism, and the distortion was almost satisfied. It can be seen from the result that a sufficiently excellent optical property can be obtained.

Sixth Example

Figure 12:
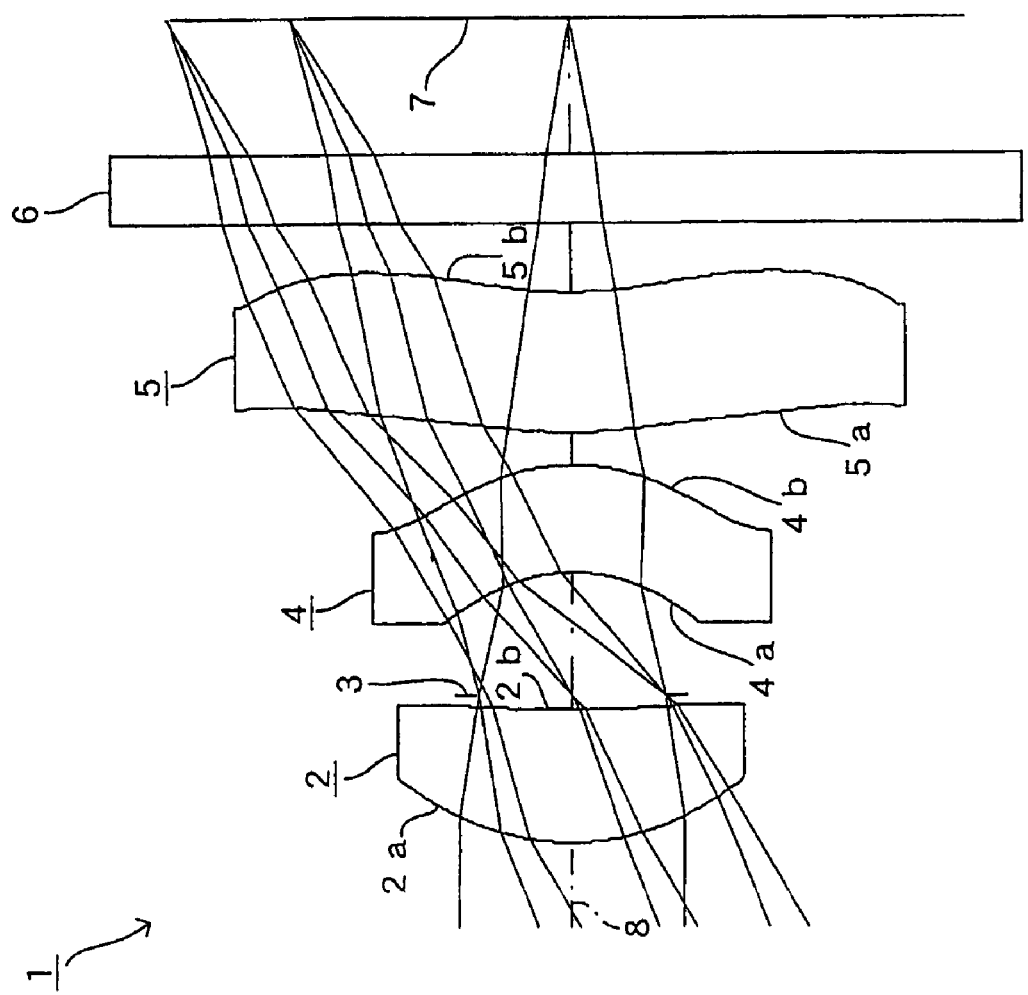
FIG. 12 is a schematic diagram for showing a SIXTH EXAMPLE of the imaging lent according to the present invention.

FIG. 12 shows a SIXTH EXAMPLE of the present invention. In the example, as in the FIRST EXAMPLE, a cover glass serving as the filter 6 is disposed between the second face 5b of the third lens 5 and the image-taking surface 7.

The imaging lens 1 of the SIXTH EXAMPLE was set under the following conditions:

Lens Data
fl = 2.91 mm, $f_1$ = 2.62 mm, $f_2$ = −194.70 mm, F no = 2.8, ω = 63.0°

| Face Number | r | d | nd | vd |
|---|---|---|---|---|
| (Object Point) | | | | |
| 1(First Face of First Lens) | 1.17 | 0.59 | 1.5310 | 56 |
| 2(Second Face of First Lens) | 5.97 | 0.06 | | |
| 3(Diaphragm) | 0.00 | 0.55 | | |
| 4(First Face of Second Lens) | −0.78 | 0.47 | 1.5850 | 30 |
| 5(Second Face of Second Lens) | −0.96 | 0.15 | | |
| 6(First Face of Third Lens) | 2.06 | 0.63 | 1.5310 | 56 |
| 7(Second Face of Third Lens) | 1.80 | 0.30 | | |
| 8(First Face of Cover Glass) | 0.000 | 0.30 | 1.5168 | 64 |
| 9(Second Face of Cover Glass) | 0.000 | | | |
| (Image Surface) | | | | |

| Face Number | k | A | B | C | D |
|---|---|---|---|---|---|
| 1 | −7.1 | 5.1E−1 | −6.9E−1 | 8.7E−1 | −6.1E−1 |
| 2 | 0 | −2.4E−2 | −1.0E−1 | −2.1E−1 | 2.8E−1 |
| 4 | −3.5E−1 | 1.4E−1 | −9.8E−1 | 4.5 | −6.2 |
| 5 | −8.5E−1 | −8.8E−2 | 2.4E−1 | 4.2E−1 | −3.2E−1 |
| 6 | −2.4E+1 | −1.2E−1 | 1.4E−1 | −6.9E−2 | 1.1E−2 |
| 7 | −1.2E+1 | −1.2E−1 | 3.9E−2 | −3.7E−3 | −1.9E−3 |

Under such conditions, $f_2/fl=-67$ was achieved, thereby satisfying the expression (1). $f_1/fl=0.90$ was achieved, thereby satisfying the expression (2). $(r_5+r_6)/(r_5-r_6)=15$ was achieved, thereby satisfying the expression (3). $r_5/fl=0.71$ was achieved, thereby satisfying the expression (4). $r_1/r_2=0.20$ was achieved, thereby satisfying the expression (5).

Figure 13:
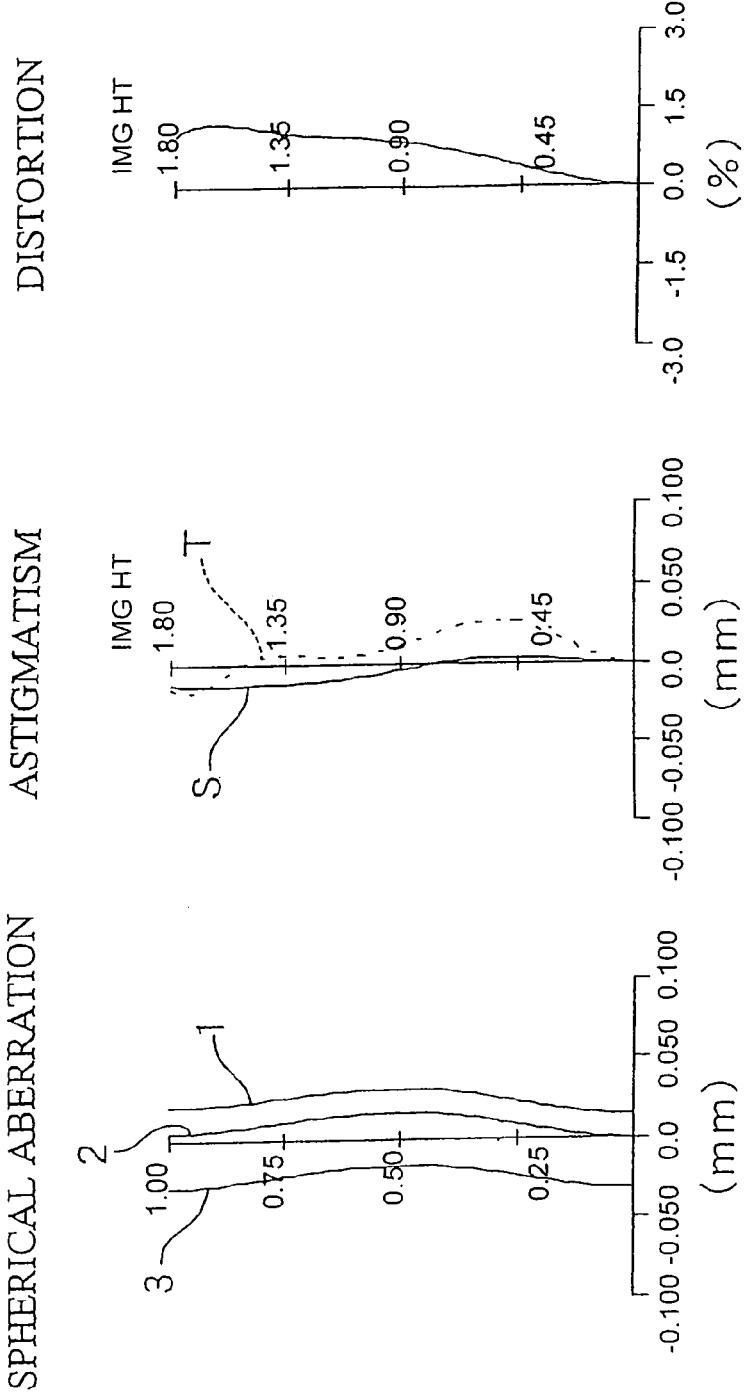
FIG. 13 shows graphs for describing the spherical aberration, astigmatism, and distortion of the imaging lens shown in FIG. 12.

FIG. 13 shows the spherical aberration, the astigmatism and the distortion in the imaging lens 1 of the SIXTH EXAMPLE.

According to the result, each of the spherical aberration, the astigmatism, and the distortion was almost satisfied. It can be seen from the result that a sufficiently excellent optical property can be obtained.

Seventh Example

Figure 14:
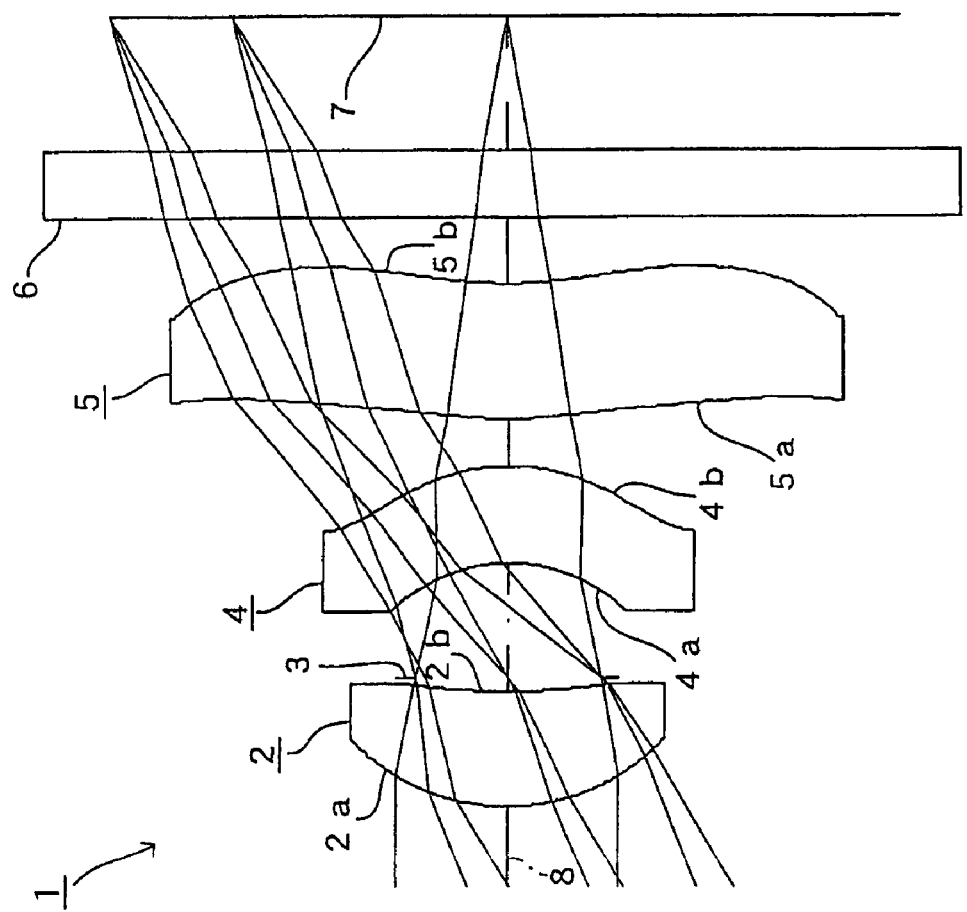
FIG. 14 is a schematic diagram for showing a SEVENTH EXAMPLE of the imaging lens according to the present invention.

FIG. 14 shows a SEVENTH EXAMPLE of the present invention. In the example, as in the FIRST EXAMPLE, a cover glass serving as the filter 6 is disposed between the second face 5b of the third lens 5 and the image-taking surface 7.

The imaging lens 1 of the SEVENTH EXAMPLE was set under the following conditions:

Lens Data
fl = 2.91 mm, $f_1$ = 2.65 mm, $f_2$ = −93.38 mm, F no = 2.8, ω = 63.7°

| Face Number | r | d | nd | vd |
|---|---|---|---|---|
| (Object Point) | | | | |
| 1(First Face of First Lens) | 1.05 | 0.51 | 1.5310 | 56 |
| 2(Second Face of First Lens) | 3.38 | 0.06 | | |
| 3(Diaphragm) | 0.00 | 0.52 | | |
| 4(First Face of Second Lens) | −0.75 | 0.43 | 1.5310 | 56 |
| 5(Second Face of Second Lens) | −0.91 | 0.22 | | |
| 6(First Face of Third Lens) | 2.07 | 0.61 | 1.5310 | 56 |
| 7(Second Face of Third Lens) | 1.85 | 0.30 | | |
| 8(First Face of Cover Glass) | 0.000 | 0.30 | 1.5168 | 64 |
| 9(Second Face of Cover Glass) | 0.000 | | | |
| (Image Surface) | | | | |

-continued

Lens Data
fl = 2.91 mm, $f_1$ = 2.65 mm, $f_2$ = −93.38 mm, F no = 2.8, ω = 63.7°

| Face Number | k | A | B | C | D |
|---|---|---|---|---|---|
| 1 | −8.6E−1 | 1.0E−1 | 1.3E−1 | −5.2E−2 | 9.1E−2 |
| 2 | 0 | 4.8E−2 | −1.7E−1 | 7.6E−1 | −1.7 |
| 4 | −6.4E−3 | 1.7E−1 | −1.2 | 7.6 | −1.1E+1 |
| 5 | −2.9E−1 | −5.9E−2 | 2.8E−1 | 8.9E−1 | −6.5E−1 |
| 6 | −2.7E+1 | −1.4E−1 | 1.5E−1 | −7.2E−2 | 1.1E−2 |
| 7 | −1.5E+1 | −1.2E−1 | 2.9E−2 | 1.2E−3 | −2.8E−3 |

Under such conditions, $f_2/fl = -32$ was achieved, thereby satisfying the expression (1). $f_1/fl = 0.91$ was achieved, thereby satisfying the expression (2). $(r_5 + r_6)/(r_5 - r_6) = 18$ was achieved, thereby satisfying the expression (3). $r_5/fl = 0.71$ was achieved, thereby satisfying the expression (4). $r_1/r_2 = 0.31$ was achieved, thereby satisfying the expression (5).

Figure 15:
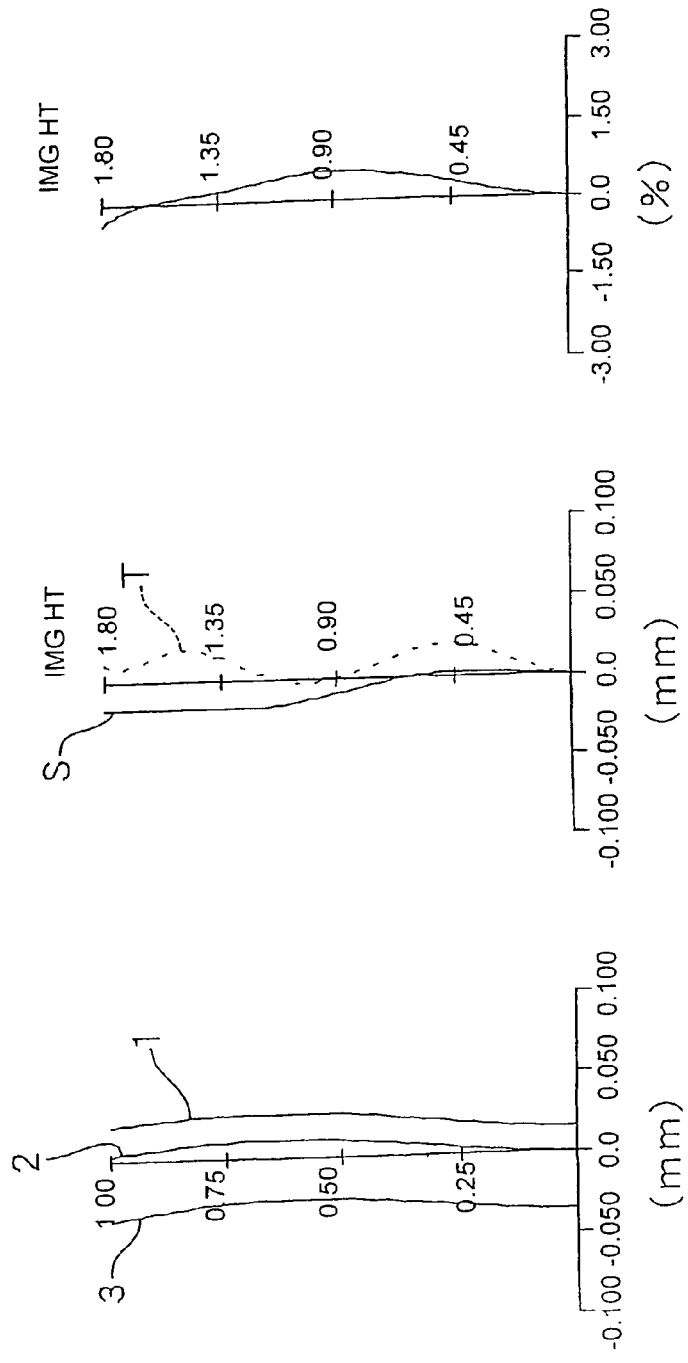
FIG. 15 shows graphs for describing the spherical aberration, astigmatism, and distortion of the imaging lens shown in FIG. 14.

FIG. 15 shows the spherical aberration, the astigmatism and the distortion in the imaging lens 1 of the SEVENTH EXAMPLE.

According to the result, each of the spherical aberration, the astigmatism, and the distortion was almost satisfied. It can be seen from the result that a sufficiently excellent optical property can be obtained.

Eighth Example

Figure 16:
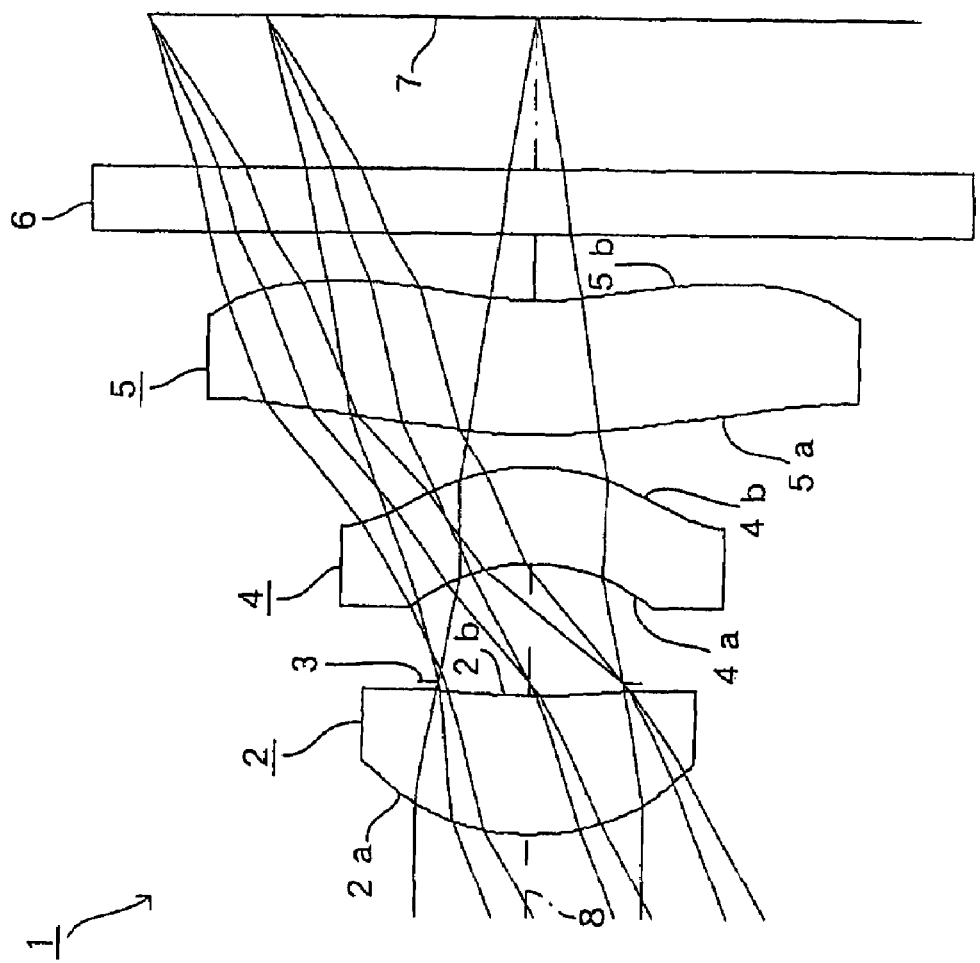
FIG. 16 is a schematic diagram for showing an EIGHTH EXAMPLE of the imaging lens according to the present invention.

FIG. 16 shows a EIGHTH EXAMPLE of the present invention. In the example, as in the FIRST EXAMPLE, a cover glass serving as the filter 6 is disposed between the second face 5b of the third lens 5 and the image-taking surface 7.

The imaging lens 1 of the EIGHTH EXAMPLE was set under the following conditions:

Lens Data
fl = 3.06 mm, $f_1$ = 2.81 mm, $f_2$ = −386.13 mm, F no = 2.8, ω = 61.2°

| Face Number | r | d | nd | vd |
|---|---|---|---|---|
| (Object Point) | | | | |
| 1(First Face of First Lens) | 1.15 | 0.63 | 1.5310 | 56 |
| 2(Second Face of First Lens) | 4.19 | 0.06 | | |
| 3(Diaphragm) | 0.00 | 0.55 | | |
| 4(First Face of Second Lens) | −0.81 | 0.45 | 1.5850 | 30 |
| 5(Second Face of Second Lens) | −0.98 | 0.15 | | |
| 6(First Face of Third Lens) | 2.06 | 0.61 | 1.5310 | 56 |
| 7(Second Face of Third Lens) | 1.84 | 0.30 | | |
| 8(First Face of Cover Glass) | 0.000 | 0.30 | 1.5168 | 64 |
| 9(Second Face of Cover Glass) | 0.000 | | | |
| (Image Surface) | | | | |

| Face Number | k | A | B | C | D |
|---|---|---|---|---|---|
| 1 | −7.0 | 5.4E−1 | −6.9E−1 | 8.9E−1 | −4.8E−1 |
| 2 | 0 | 1.3E−2 | −4.8E−2 | 2.5E−1 | −9.4E−1 |
| 4 | −3.4E−1 | 1.8E−1 | −6.6E−1 | 3.3 | −4.7 |
| 5 | −9.5E−1 | −7.6E−2 | 3.3E−1 | 2.3E−1 | −2.6E−1 |
| 6 | −3.1E+1 | −7.6E−2 | 9.1E−2 | −4.1E−2 | 6.1E−3 |
| 7 | −1.7E+1 | −1.0E−1 | 2.4E−2 | 5.8E−4 | −2.1E−3 |

Under such conditions, $f_2/fl = -126$ was achieved, thereby satisfying the expression (1). $f_1/fl = 0.92$ was achieved, thereby satisfying the expression (2). $(r_5 + r_6)/(r_5 - r_6) = 18$ was achieved, thereby satisfying the expression (3). $r_5/fl = 0.67$ was achieved, thereby satisfying the expression (4). $r_1/r_2 = 0.28$ was achieved, thereby satisfying the expression (5).

Figure 17:
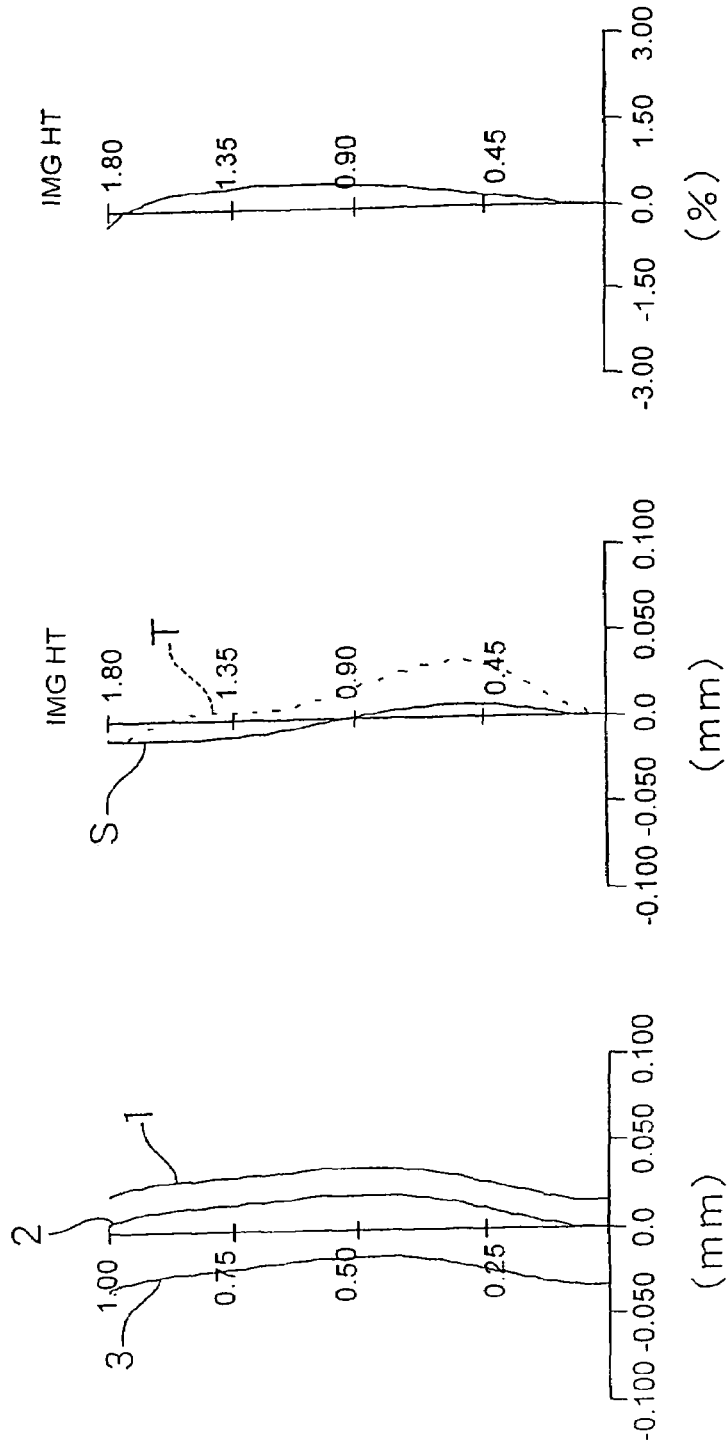
FIG. 17 shows graphs for describing the spherical aberration, astigmatism, and distortion of the imaging lens shown in FIG. 16.

FIG. 17 shows the spherical aberration, the astigmatism and the distortion in the imaging lens 1 of the EIGHTH EXAMPLE.

According to the result, each of the spherical aberration, the astigmatism, and the distortion was almost satisfied. It can be seen from the result that a sufficiently excellent optical property can be obtained.

Ninth Example

Figure 18:
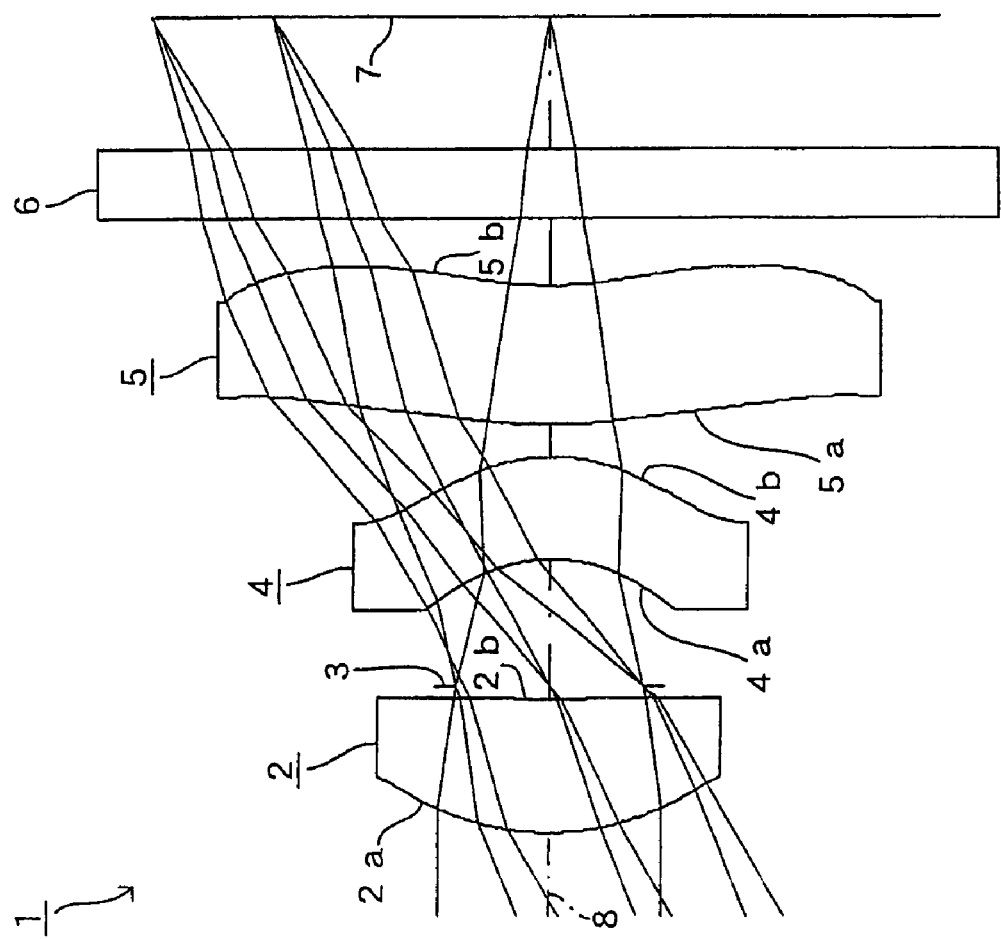
FIG. 18 is a schematic diagram for showing a NINTH EXAMPLE of the imaging lens according to the present invention.

FIG. 18 shows a NINTH EXAMPLE of the present invention. In the example, as in the FIRST EXAMPLE, a cover glass serving as the filter 6 is disposed between the second face 5b of the third lens 5 and the image-taking surface 7.

The imaging lens 1 of the NINTH EXAMPLE was set under the following conditions:

Lens Data
fl = 2.91 mm, $f_1$ = 2.57 mm, $f_2$ = −223.08 mm, F no = 2.8, ω = 62.9°

| Face Number | r | d | nd | vd |
|---|---|---|---|---|
| (Object Point) | | | | |
| 1(First Face of First Lens) | 1.22 | 0.59 | 1.5310 | 56 |
| 2(Second Face of First Lens) | 9.60 | 0.06 | | |
| 3(Diaphragm) | 0.00 | 0.57 | | |
| 4(First Face of Second Lens) | −0.72 | 0.46 | 1.5850 | 30 |
| 5(Second Face of Second Lens) | −0.89 | 0.14 | | |
| 6(First Face of Third Lens) | 2.05 | 0.63 | 1.5310 | 56 |
| 7(Second Face of Third Lens) | 1.74 | 0.30 | | |
| 8(First Face of Cover Glass) | 0.000 | 0.30 | 1.5168 | 64 |
| 9(Second Face of Cover Glass) | 0.000 | | | |
| (Image Surface) | | | | |

| Face Number | k | A | B | C | D |
|---|---|---|---|---|---|
| 1 | −7.5 | 4.7E−1 | −7.1E−1 | 8.9E−1 | −7.2E−1 |
| 2 | 0 | −6.9E−2 | −1.5E−1 | −1.2E−1 | 7.7E−2 |
| 4 | −4.0E−1 | 1.3E−1 | −6.9E−1 | 4.26 | −5.7 |
| 5 | −8.6E−1 | −8.9E−2 | 2.9E−1 | 5.2E−1 | −4.2E−1 |
| 6 | −2.7E+1 | −1.1E−1 | 1.4E−1 | −6.8E−2 | 1.1E−2 |
| 7 | −1.3E+1 | −1.3E−1 | 4.1E−2 | −2.2E−3 | −2.5E−3 |

Under such conditions, $f_2/fl = -77$ was achieved, thereby satisfying the expression (1). $f_1/fl = 0.88$ was achieved, thereby satisfying the expression (2). $(r_5 + r_6)/(r_5 - r_6) = 12$ was achieved, thereby satisfying the expression (3). $r_5/fl = 0.70$ was achieved, thereby satisfying the expression (4). $r_1/r_2 = 0.13$ was achieved, thereby satisfying the expression (5).

Figure 19:
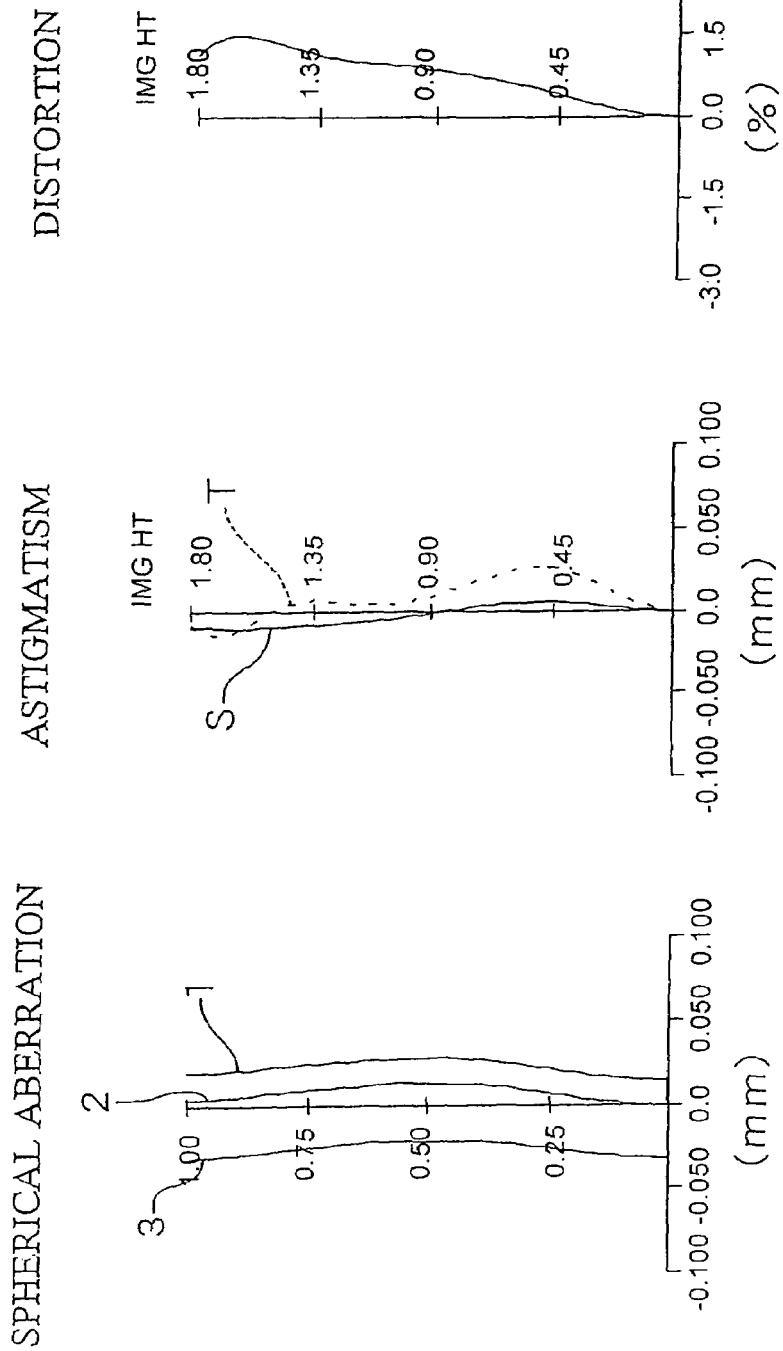
FIG. 19 shows graphs for describing the spherical aberration, astigmatism, and distortion of the imaging lens shown in FIG. 18.

FIG. 19 shows the spherical aberration, the astigmatism and the distortion in the imaging lens 1 of the NINTH EXAMPLE.

According to the result, each of the spherical aberration, the astigmatism, and the distortion was almost satisfied. It can be seen from the result that a sufficiently excellent optical property can be obtained.

Tenth Example

Figure 20:
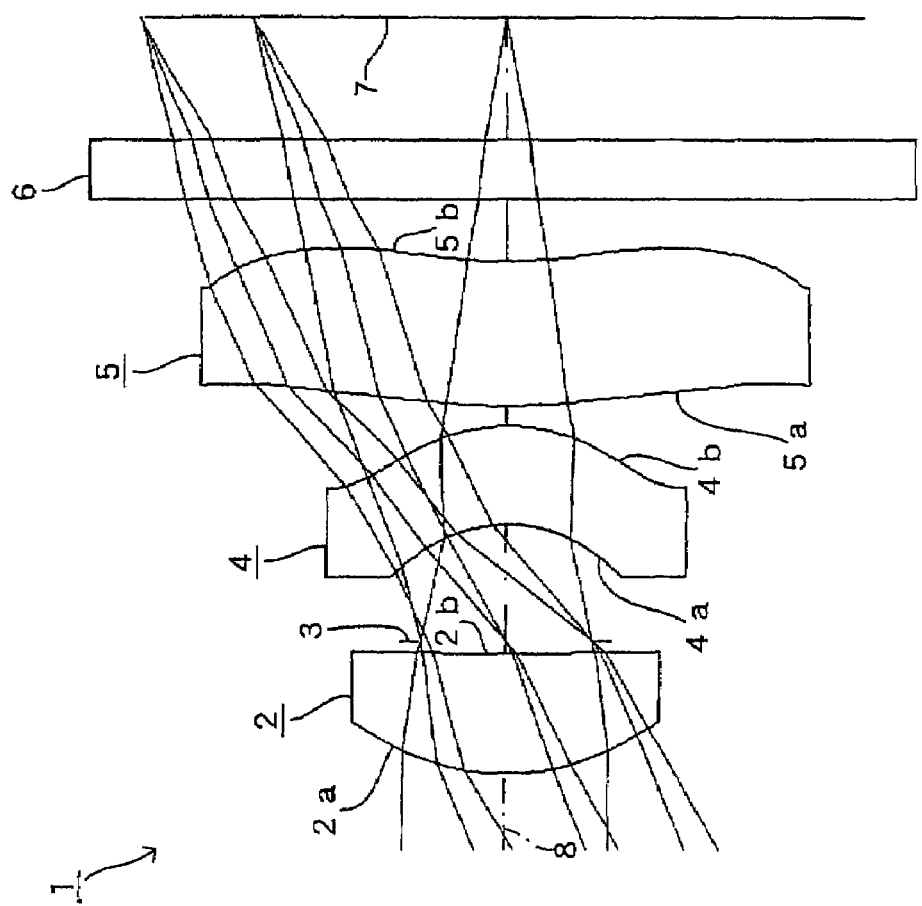
FIG. 20 is a schematic diagram for showing a TENTH EXAMPLE of the imaging lens according to the present invention.

FIG. 20 shows a TENTH EXAMPLE of the present invention. In the example, as in the FIRST EXAMPLE, a cover glass serving as the filter 6 is disposed between the second face 5b of the third lens 5 and the image-taking surface 7.

The imaging lens 1 of the TENTH EXAMPLE was set under the following conditions:

Lens Data
fl = 2.91 mm, $f_1$ = 2.54 mm, $f_2$ = −92.84 mm, F no = 2.8, ω = 63.0°

| Face Number | r | d | nd | νd |
|---|---|---|---|---|
| (Object Point) | | | | |
| 1(First Face of First Lens) | 1.19 | 0.58 | 1.5310 | 56 |
| 2(Second Face of First Lens) | 8.27 | 0.06 | | |
| 3(Diaphragm) | 0.00 | 0.57 | | |
| 4(First Face of Second Lens) | −0.69 | 0.47 | 1.5850 | 30 |
| 5(Second Face of Second Lens) | −0.88 | 0.10 | | |
| 6(First Face of Third Lens) | 2.46 | 0.71 | 1.5310 | 56 |
| 7(Second Face of Third Lens) | 2.21 | 0.30 | | |
| 8(First Face of Cover Glass) | 0.000 | 0.30 | 1.5168 | 64 |
| 9(Second Face of Cover Glass) (Image Surface) | 0.000 | | | |

| Face Number | k | A | B | C | D |
|---|---|---|---|---|---|
| 1 | −6.9 | 4.8E−1 | −7.1E−1 | 9.2E−1 | −8.0E−1 |
| 2 | 0 | −6.7E−2 | −1.7E−1 | −1.6E−1 | 1.2E−1 |
| 4 | −3.7E−1 | 1.2E−1 | −6.2E−1 | 4.2 | −6.0 |
| 5 | −8.9E−1 | −8.3E−2 | 2.6E−1 | 5.2E−1 | −4.0E−1 |
| 6 | −3.6E+1 | −9.9E−2 | 1.3E−1 | −6.9E−2 | 1.1E−2 |
| 7 | −1.5E+1 | −1.3E−1 | 4.0E−2 | −2.4E−3 | −2.5E−3 |

Under such conditions, $f_2/fl = -32$ was achieved, thereby satisfying the expression (1). $f_1/fl = 0.87$ was achieved, thereby satisfying the expression (2). $(r_5+r_6)/(r_5-r_6) = 18$ was achieved, thereby satisfying the expression (3). $r_5/fl = 0.85$ was achieved, thereby satisfying the expression (4). $r_1/r_2 = 0.14$ was achieved, thereby satisfying the expression (5).

Figure 21:
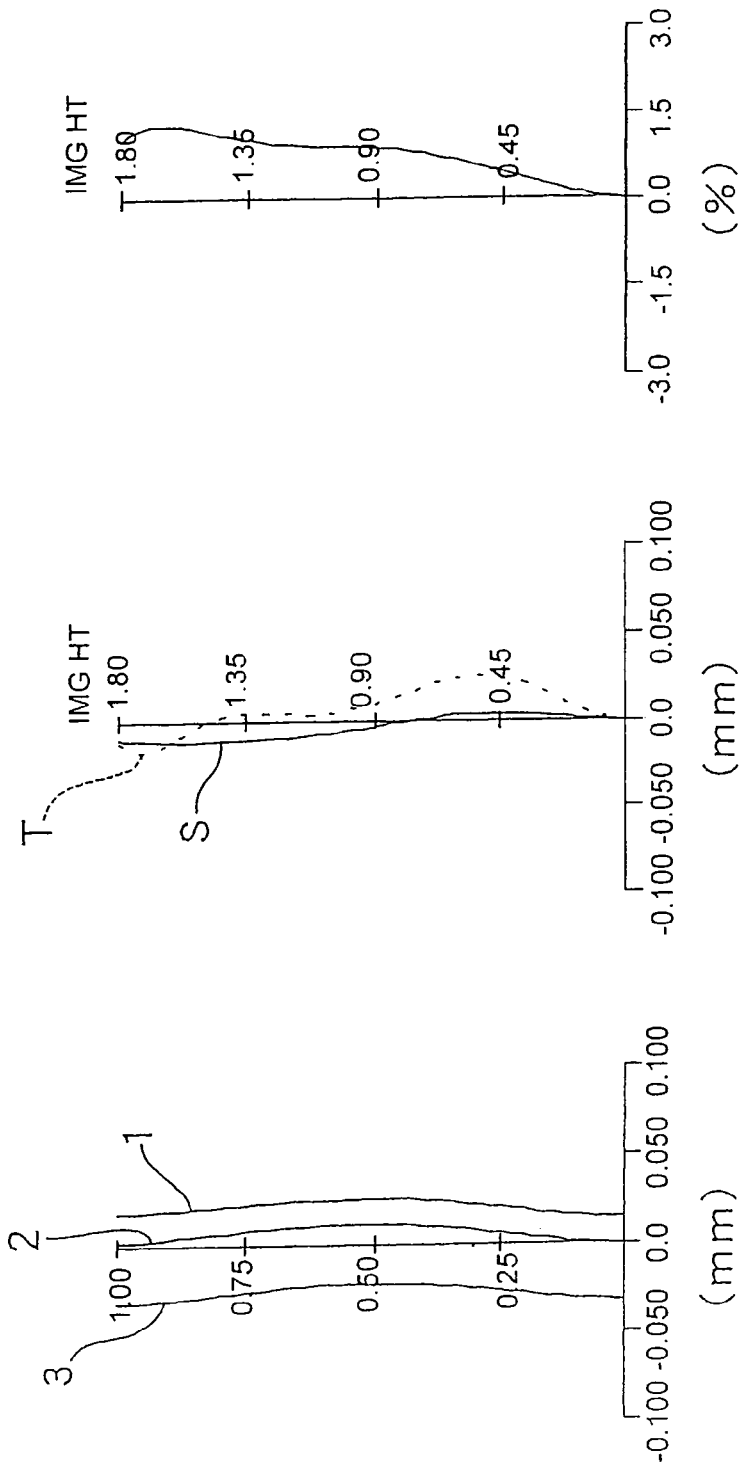
FIG. 21 shows graphs for describing the spherical aberration, astigmatism, and distortion of the imaging lens shown in FIG. 20.

FIG. 21 shows the spherical aberration, the astigmatism and the distortion in the imaging lens 1 of the TENTH EXAMPLE.

According to the result, each of the spherical aberration, the astigmatism, and the distortion was almost satisfied. It can be seen from the result that a sufficiently excellent optical property can be obtained.

Eleventh Example

Figure 22:
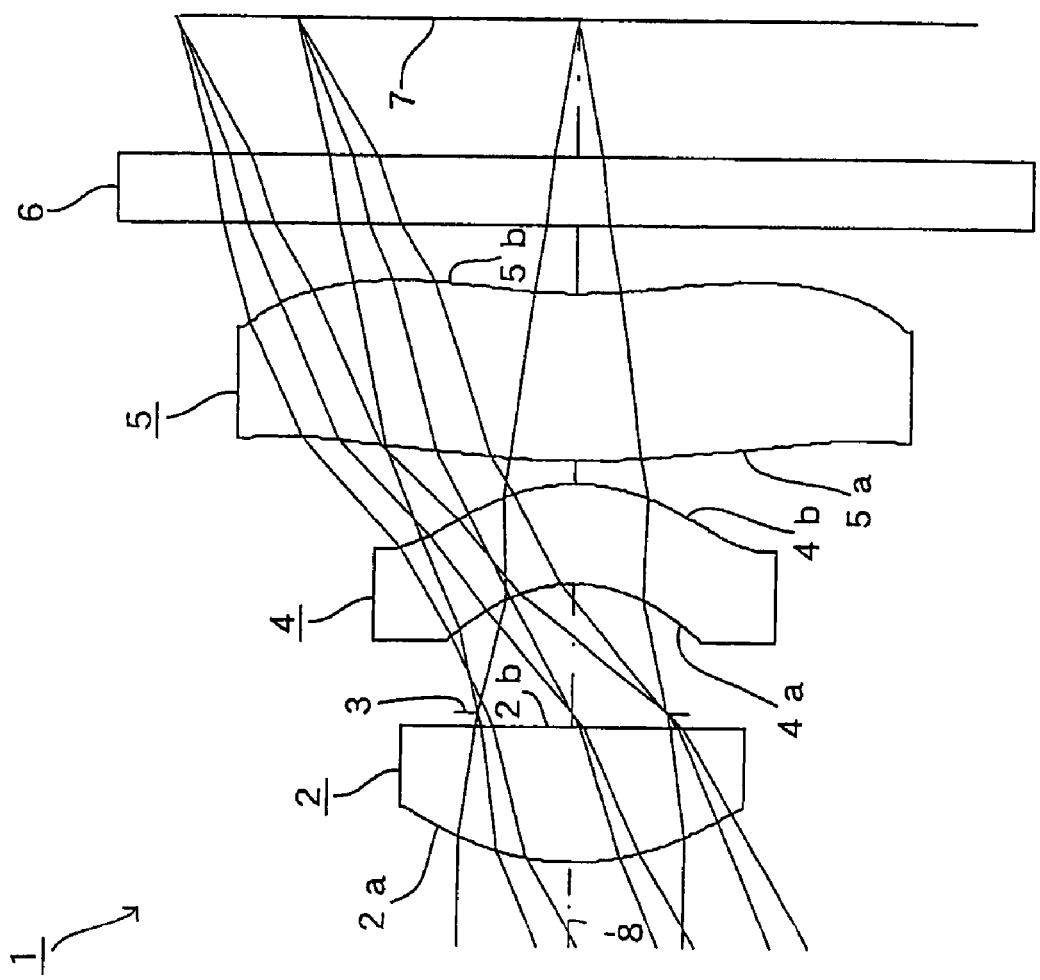
FIG. 22 is a schematic diagram for showing a ELEVENTH EXAMPLE of the imaging lens according to the present invention.

FIG. 22 shows an ELEVENTH EXAMPLE of the present invention. In the example, as in the FIRST EXAMPLE, a cover glass serving as the filter 6 is disposed between the second face 5b of the third lens 5 and the image-taking surface 7.

The imaging lens 1 of the ELEVENTH EXAMPLE was set under the following conditions:

Lens Data
fl = 2.91 mm, $f_1$ = 2.54 mm, $f_2$ = −92.90 mm, F no = 2.8, ω = 63.0°

| Face Number | r | d | nd | νd |
|---|---|---|---|---|
| (Object Point) | | | | |
| 1(First Face of First Lens) | 1.20 | 0.58 | 1.5310 | 56 |
| 2(Second Face of First Lens) | 9.07 | 0.06 | | |
| 3(Diaphragm) | 0.00 | 0.57 | | |
| 4(First Face of Second Lens) | −0.67 | 0.45 | 1.5850 | 30 |
| 5(Second Face of Second Lens) | −0.84 | 0.10 | | |
| 6(First Face of Third Lens) | 2.66 | 0.74 | 1.5310 | 56 |
| 7(Second Face of Third Lens) | 2.40 | 0.30 | | |
| 8(First Face of Cover Glass) | 0.000 | 0.30 | 1.5168 | 64 |
| 9(Second Face of Cover Glass) (Image Surface) | 0.000 | | | |

-continued

Lens Data
fl = 2.91 mm, $f_1$ = 2.54 mm, $f_2$ = −92.90 mm, F no = 2.8, ω = 63.0°

| Face Number | k | A | B | C | D |
|---|---|---|---|---|---|
| 1 | −7.0 | 4.7E−1 | −7.2E−1 | 9.3E−1 | −8.3E−1 |
| 2 | 0 | −7.4E−2 | −2.0E−1 | 9.8E−3 | −2.1E−1 |
| 4 | −3.8E−1 | 1.2E−1 | −4.1E−1 | 4.1 | −6.0 |
| 5 | −9.1E−1 | −8.3E−2 | 3.0E−1 | 6.1E−1 | −5.0E−1 |
| 6 | −4.6E+1 | −8.5E−2 | 1.2E−1 | −6.7E−2 | 1.2E−2 |
| 7 | −1.8E+1 | −1.2E−1 | 3.8E−2 | −2.7E−3 | −2.4E−3 |

Under such conditions, $f_2/fl = -32$ was achieved, thereby satisfying the expression (1). $f_1/fl = 0.87$ was achieved, thereby satisfying the expression (2). $(r_5+r_6)/(r_5-r_6) = 19$ was achieved, thereby satisfying the expression (3). $r_5/fl = 0.92$ was achieved, thereby satisfying the expression (4). $r_1/r_2 = 0.13$ was achieved, thereby satisfying the expression (5).

Figure 23:
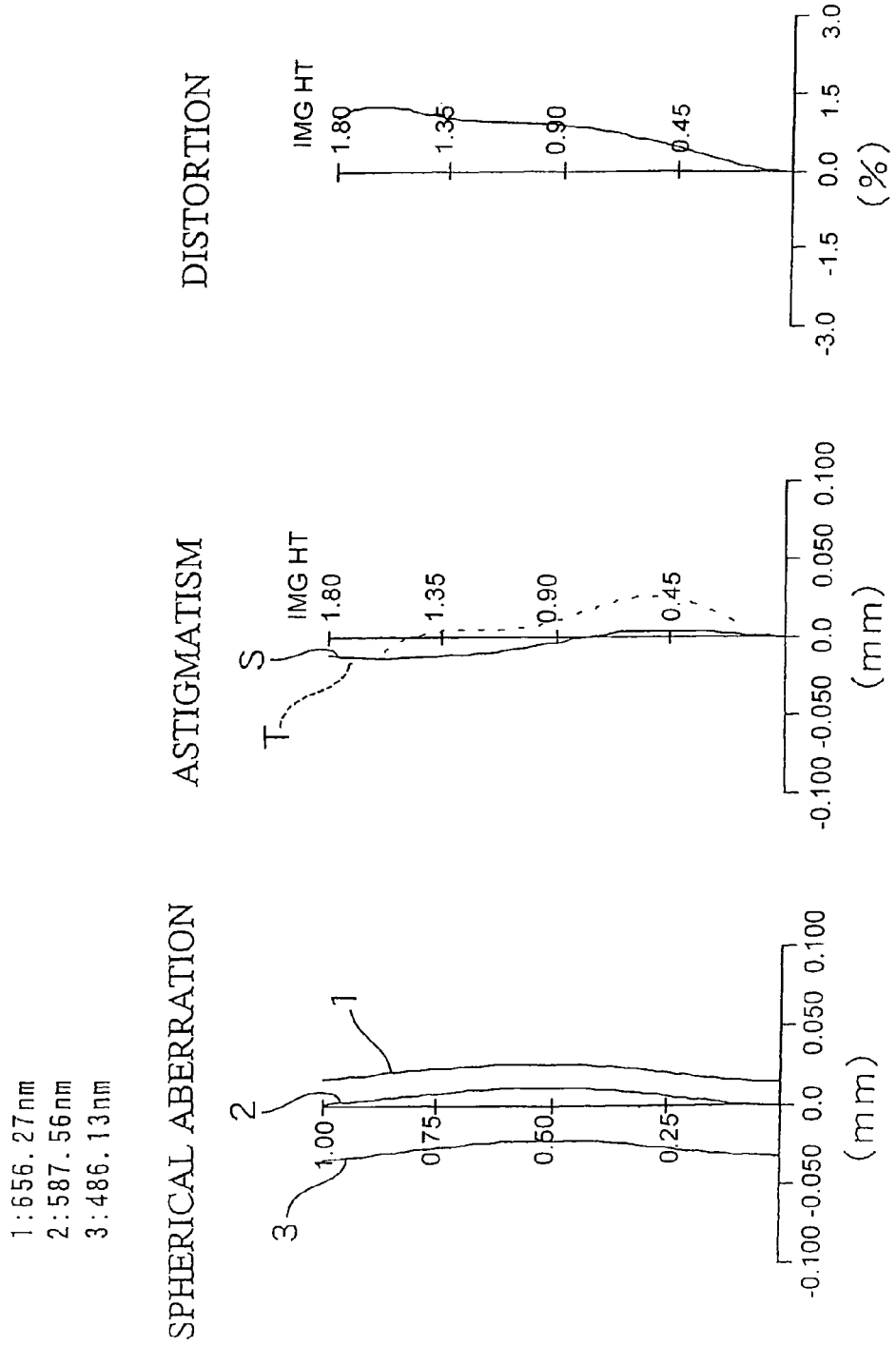
FIG. 23 shows graphs for describing the spherical aberration, astigmatism, and distortion of the imaging lens shown in FIG. 22.

FIG. 23 shows the spherical aberration, the astigmatism and the distortion in the imaging lens 1 of the ELEVENTH EXAMPLE.

According to the result, each of the spherical aberration, the astigmatism, and the distortion was almost satisfied. It can be seen from the result that a sufficiently excellent optical property can be obtained.

Twelfth Example

Figure 24:
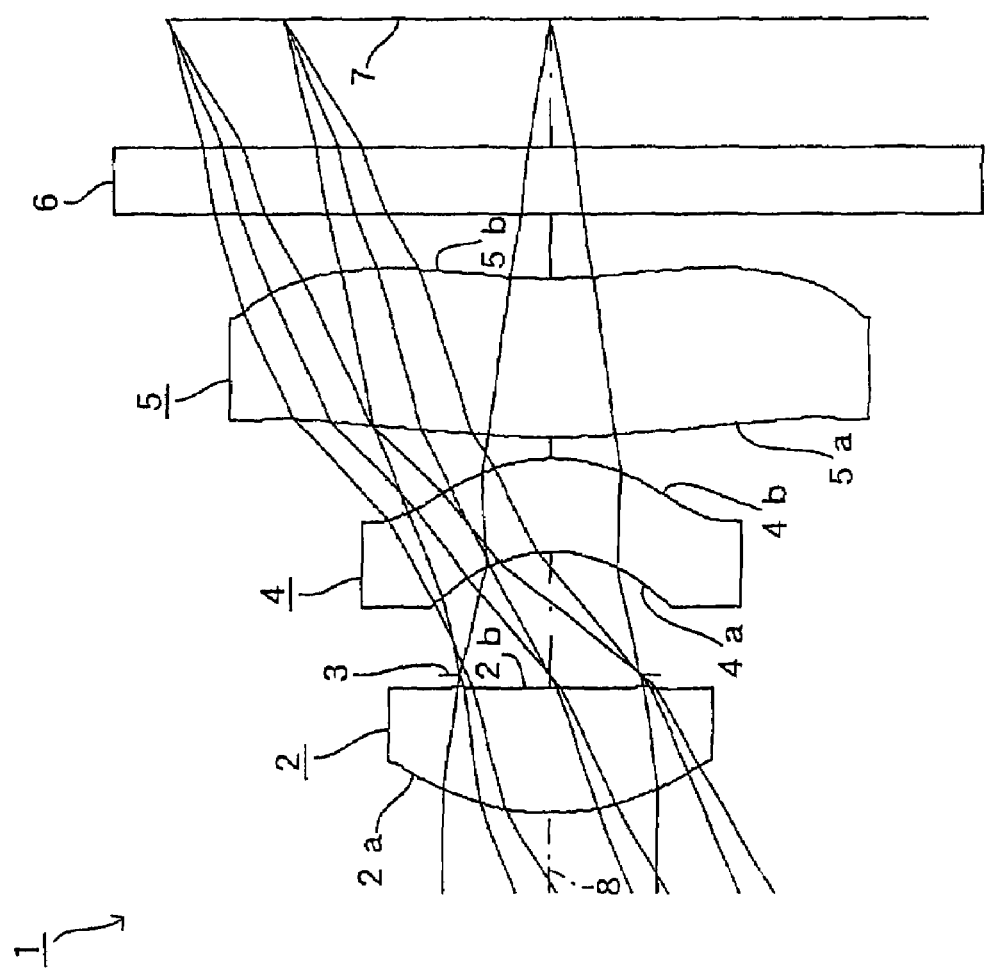
FIG. 24 is a schematic diagram for showing a TWELFTH EXAMPLE of the imaging lens according to the present invention.

FIG. 24 shows a TWELFTH EXAMPLE of the present invention. In the example, as in the FIRST EXAMPLE, a cover glass serving as the filter 6 is disposed between the second face 5b of the third lens 5 and the image-taking surface 7.

The imaging lens 1 of the TWELFTH EXAMPLE was set under the following conditions:

Lens Data
fl = 2.91 mm, $f_1$ = 2.53 mm, $f_2$ = −92.84 mm, F no = 2.8, ω = 63.0°

| Face Number | r | d | nd | νd |
|---|---|---|---|---|
| (Object Point) | | | | |
| 1(First Face of First Lens) | 1.20 | 0.57 | 1.5310 | 56 |
| 2(Second Face of First Lens) | 9.22 | 0.06 | | |
| 3(Diaphragm) | 0.00 | 0.57 | | |
| 4(First Face of Second Lens) | −0.66 | 0.43 | 1.5850 | 30 |
| 5(Second Face of Second Lens) | −0.83 | 0.10 | | |
| 6(First Face of Third Lens) | 2.83 | 0.75 | 1.5310 | 56 |
| 7(Second Face of Third Lens) | 2.56 | 0.30 | | |
| 8(First Face of Cover Glass) | 0.000 | 0.30 | 1.5168 | 64 |
| 9(Second Face of Cover Glass) (Image Surface) | 0.000 | | | |

| Face Number | k | A | B | C | D |
|---|---|---|---|---|---|
| 1 | −6.9 | 4.7E−1 | −7.2E−1 | 9.4E−1 | −8.6E−1 |
| 2 | 0 | −7.6E−2 | −2.2E−1 | 8.8E−2 | −3.5E−1 |
| 4 | −3.7E−1 | 1.3E−1 | −2.7E−1 | 4.2 | −6.2 |
| 5 | −9.3E−1 | −8.0E−2 | 3.2E−1 | 6.9E−1 | −6.0E−1 |
| 6 | −5.5E+1 | −7.5E−2 | 1.1E−1 | −6.5E−2 | 1.2E−2 |
| 7 | −2.2E+1 | −1.2E−1 | 3.7E−2 | −3.0E−3 | −2.3E−3 |

Under such conditions, $f_2/fl = -32$ was achieved, thereby satisfying the expression (1). $f_1/fl = 0.87$ was achieved, thereby satisfying the expression (2). $(r_5+r_6)/(r_5-r_6) = 20$ was achieved, thereby satisfying the expression (3). $r_5/fl = 0.97$ was achieved, thereby satisfying the expression (4). $r_1/r_2$=0.13 was achieved, thereby satisfying the expression (5).

Figure 25:
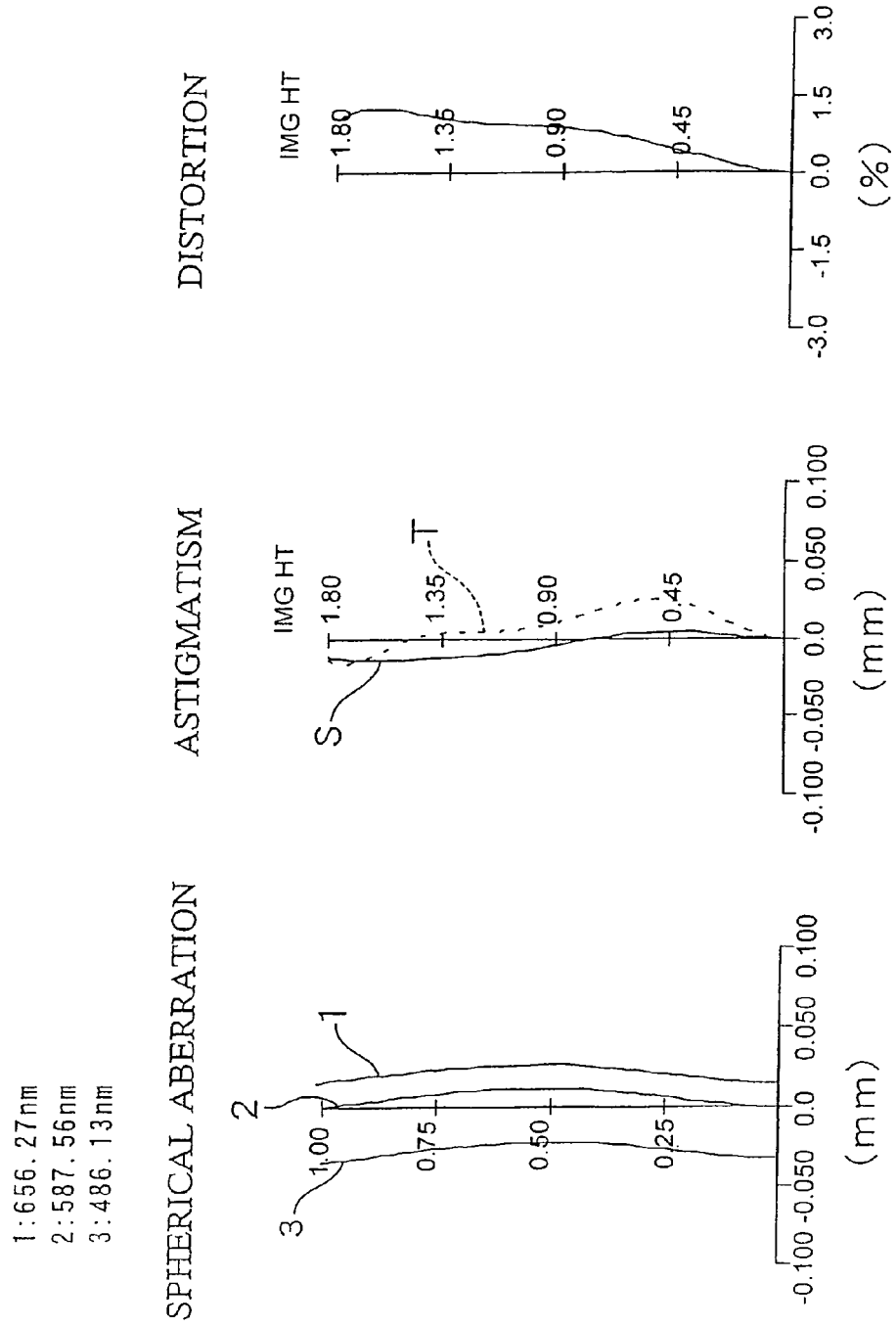
FIG. 25 shows graphs for describing the spherical aberration, astigmatism, and distortion of the imaging lens shown in FIG. 24.

FIG. 25 shows the spherical aberration, the astigmatism and the distortion in the imaging lens 1 of the TWELFTH EXAMPLE.

According to the result, each of the spherical aberration, the astigmatism, and the distortion was almost satisfied. It can be seen from the result that a sufficiently excellent optical property can be obtained.

Thirteenth Example

Figure 26:
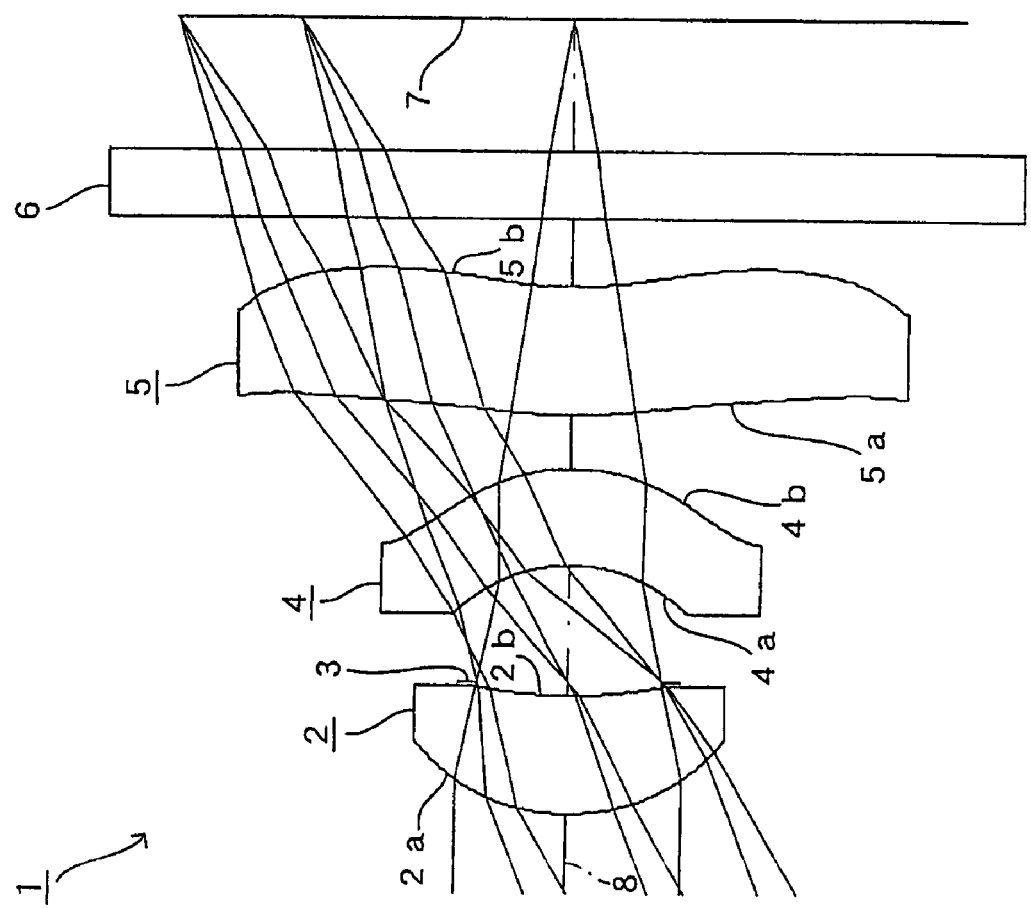
FIG. 26 is a schematic diagram for showing a THIRTEENTH EXAMPLE of the imaging lens according to the present invention.

FIG. 26 shows a THIRTEENTH EXAMPLE of the present invention. In the example, as in the FIRST EXAMPLE, a cover glass serving as the filter 6 is disposed between the second face 5b of the third lens 5 and the image-taking surface 7.

The imaging lens 1 of the THIRTEENTH EXAMPLE was set under the following conditions:

| Lens Data fl = 2.98 mm, $f_1$ = 2.76 mm, $f_2$ = −264.12 mm, F no = 2.8, ω = 62.5° | | | | |
|---|---|---|---|---|
| Face Number | r | d | nd | νd |
| (Object Point) | | | | |
| 1(First Face of First Lens) | 0.99 | 0.53 | 1.5310 | 56 |
| 2(Second Face of First Lens) | 2.47 | 0.06 | | |
| 3(Diaphragm) | 0.00 | 0.52 | | |
| 4(First Face of Second Lens) | −0.78 | 0.43 | 1.5310 | 56 |
| 5(Second Face of Second Lens) | −0.93 | 0.24 | | |
| 6(First Face of Third Lens) | 2.07 | 0.59 | 1.5310 | 56 |
| 7(Second Face of Third Lens) | 1.86 | 0.30 | | |
| 8(First Face of Cover Glass) | 0.000 | 0.30 | 1.5168 | 64 |
| 9(Second Face of Cover Glass) (Image Surface) | 0.000 | | | |

| Face Number | k | A | B | C | D |
|---|---|---|---|---|---|
| 1 | −7.3E−1 | 1.2E−1 | 1.8E−1 | −1.6E−1 | 5.8E−1 |
| 2 | 0 | 1.0E−1 | −7.9E−2 | 1.3 | −2.8 |
| 4 | 8.5E−2 | 5.2E−2 | −1.2 | 7.2 | −1.0E+1 |
| 5 | −2.6E−1 | −1.1E−1 | 2.0E−1 | 8.2E−1 | −4.9E−1 |
| 6 | −2.9E+1 | −1.5E−1 | 1.6E−1 | −7.1E−2 | 1.0E−2 |
| 7 | −1.5E+1 | −1.1E−1 | 2.6E−2 | 2.3E−3 | −2.8E−3 |

Under such conditions, $f_2/fl$=−88 was achieved, thereby satisfying the expression (1). $f_1/fl$=0.92 was achieved, thereby satisfying the expression (2). $(r_5+r_6)/(r_5-r_6)$=19 was achieved, thereby satisfying the expression (3). $r_5/fl$=0.70 was achieved, thereby satisfying the expression (4). $r_1/r_2$=0.40 was achieved, thereby satisfying the expression (5).

Figure 27:
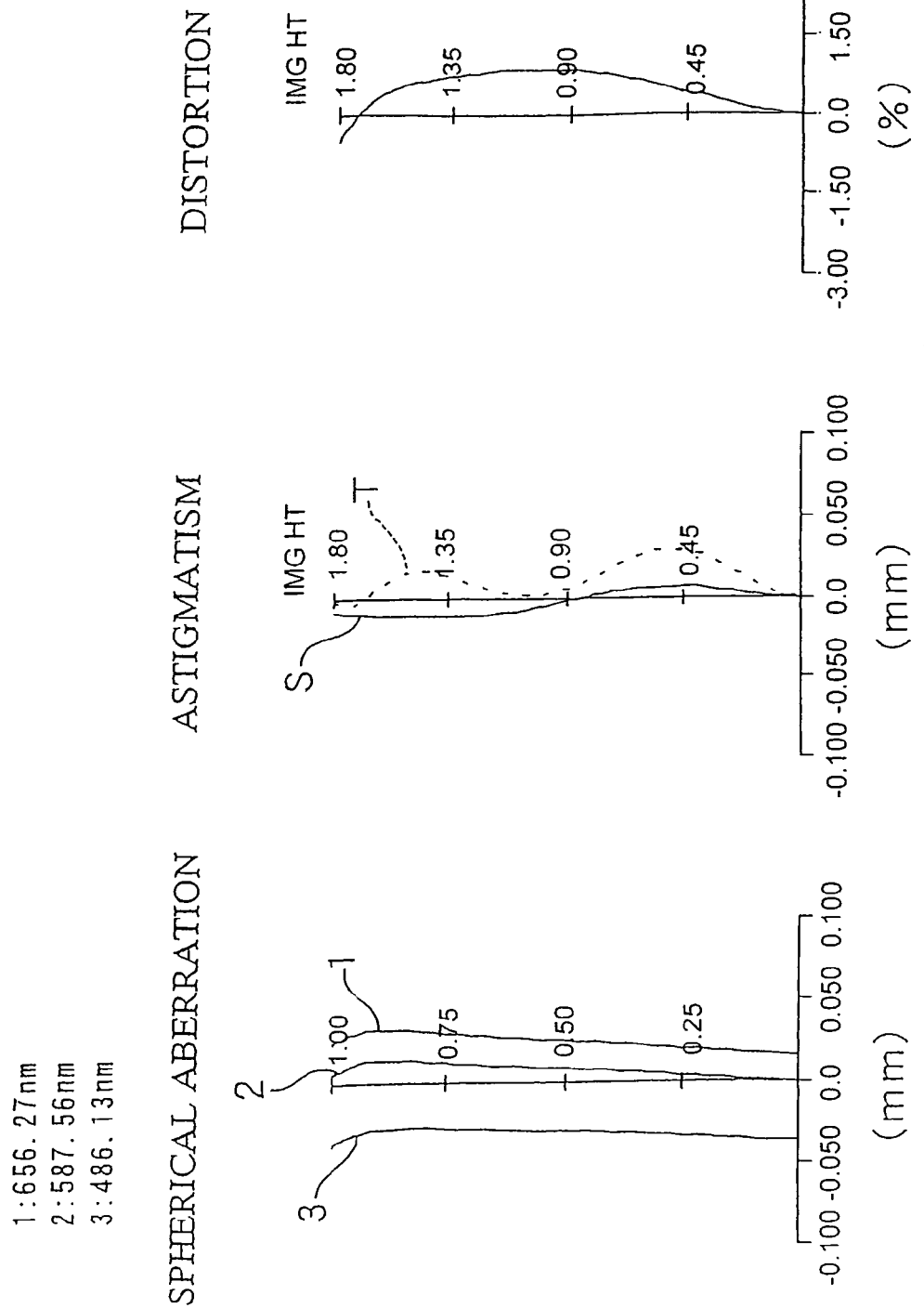
FIG. 27 shows graphs for describing the spherical aberration, astigmatism, and distortion of the imaging lens shown in FIG. 26.

FIG. 27 shows the spherical aberration, the astigmatism and the distortion in the imaging lens 1 of the THIRTEENTH EXAMPLE.

According to the result, each of the spherical aberration, the astigmatism, and the distortion was almost satisfied. It can be seen from the result that a sufficiently excellent optical property can be obtained.

Fourteenth Example

Figure 28:
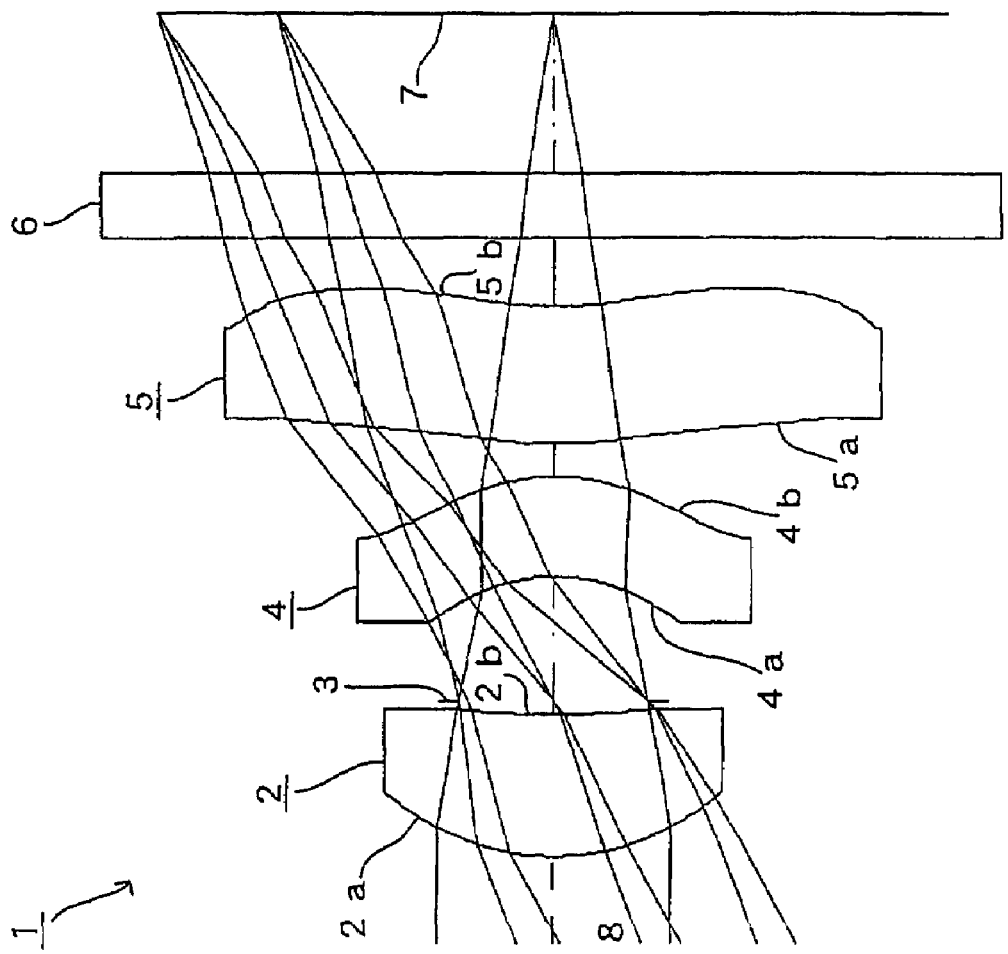
FIG. 28 is a schematic diagram for showing a FOURTEENTH EXAMPLE of the imaging lens according to the present invention.

FIG. 28 shows a FOURTEENTH EXAMPLE of the present invention. In the example, as in the FIRST EXAMPLE, a cover glass serving as the filter 6 is disposed between the second face 5b of the third lens 5 and the image-taking surface 7.

The imaging lens 1 of the FOURTEENTH EXAMPLE was set under the following conditions:

| Lens Data fl = 3.06 mm, $f_1$ = 2.81 mm, $f_2$ = −218.99 mm, F no = 2.8, ω = 61.3° | | | | |
|---|---|---|---|---|
| Face Number | r | d | nd | νd |
| (Object Point) | | | | |
| 1(First Face of First Lens) | 1.17 | 0.63 | 1.5310 | 56 |
| 2(Second Face of First Lens) | 4.43 | 0.06 | | |
| 3(Diaphragm) | 0.00 | 0.55 | | |
| 4(First Face of Second Lens) | −0.82 | 0.45 | 1.5850 | 30 |
| 5(Second Face of Second Lens) | −0.99 | 0.15 | | |
| 6(First Face of Third Lens) | 2.00 | 0.61 | 1.5310 | 56 |
| 7(Second Face of Third Lens) | 1.78 | 0.30 | | |
| 8(First Face of Cover Glass) | 0.000 | 0.30 | 1.5168 | 64 |
| 9(Second Face of Cover Glass) (Image Surface) | 0.000 | | | |

| Face Number | k | A | B | C | D |
|---|---|---|---|---|---|
| 1 | −7.2 | 5.3E−1 | −6.9E−1 | 8.8E−1 | −4.9E−1 |
| 2 | 0 | 7.0E−4 | 3.0E−3 | −1.7E−2 | −4.5E−1 |
| 4 | −4.3E−1 | 1.9E−1 | −1.0 | 4.4 | −5.8 |
| 5 | −9.1E−1 | −7.9E−2 | 2.4E−1 | 4.1E−1 | −3.6E−1 |
| 6 | −2.5E+1 | −1.3E−1 | 1.4E−1 | −6.8E−2 | 1.1E−2 |
| 7 | −1.4E+1 | −1.2E−1 | 3.6E−2 | −3.7E−3 | −1.6E−3 |

Under such conditions, $f_2/fl$=−72 was achieved, thereby satisfying the expression (1). $f_1/fl$=0.92 was achieved, thereby satisfying the expression (2). $(r_5+r_6)/(r_5-r_6)$=17 was achieved, thereby satisfying the expression (3). $r_5/fl$=0.65 was achieved, thereby satisfying the expression (4). $r_1/r_2$=0.26 was achieved, thereby satisfying the expression (5).

Figure 29:
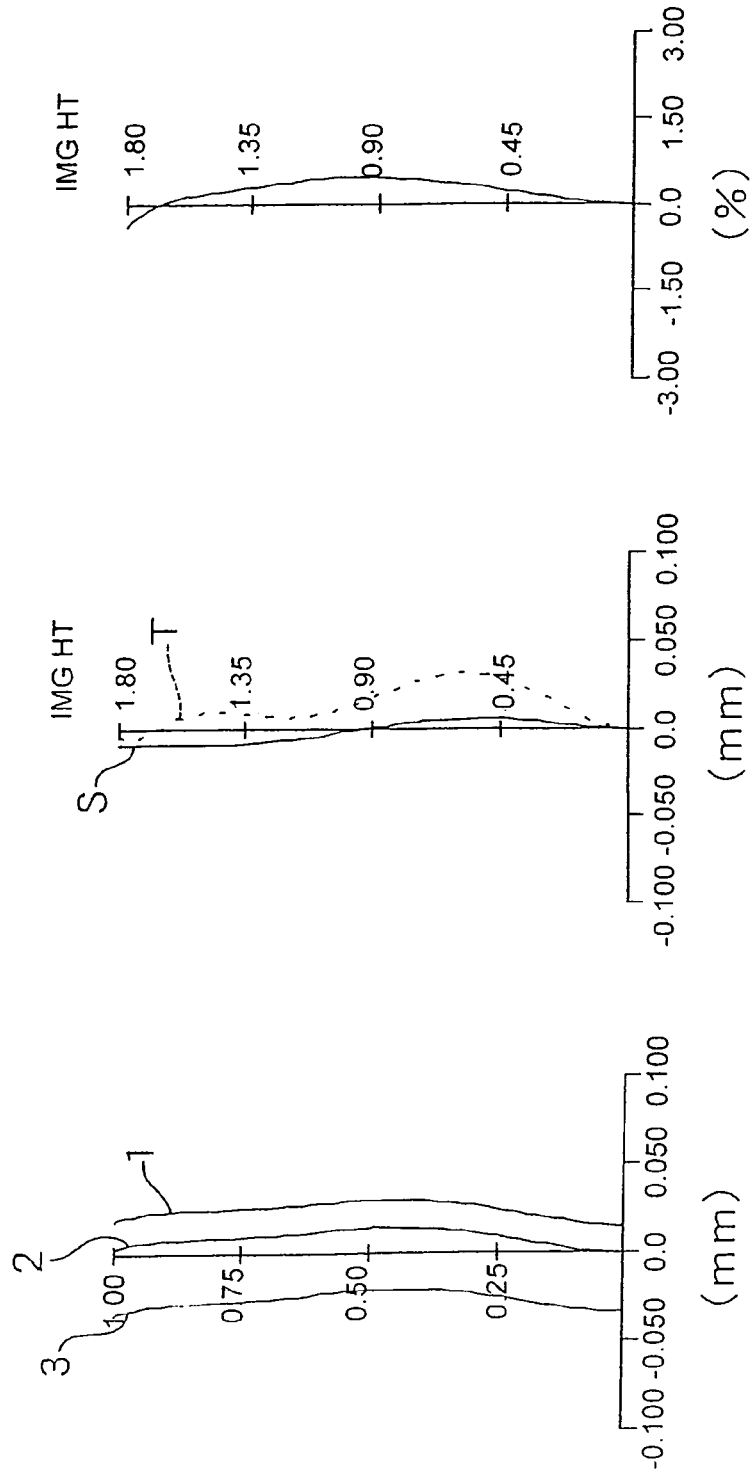
FIG. 29 shows graphs for describing the spherical aberration, astigmatism, and distortion of the imaging lens shown in FIG. 28.

FIG. 29 shows the spherical aberration, the astigmatism and the distortion in the imaging lens 1 of the FOURTEENTH EXAMPLE.

According to the result, each of the spherical aberration, the astigmatism, and the distortion was almost satisfied. It can be seen from the result that a sufficiently excellent optical property can be obtained.

Fifteenth Example

Figure 30:
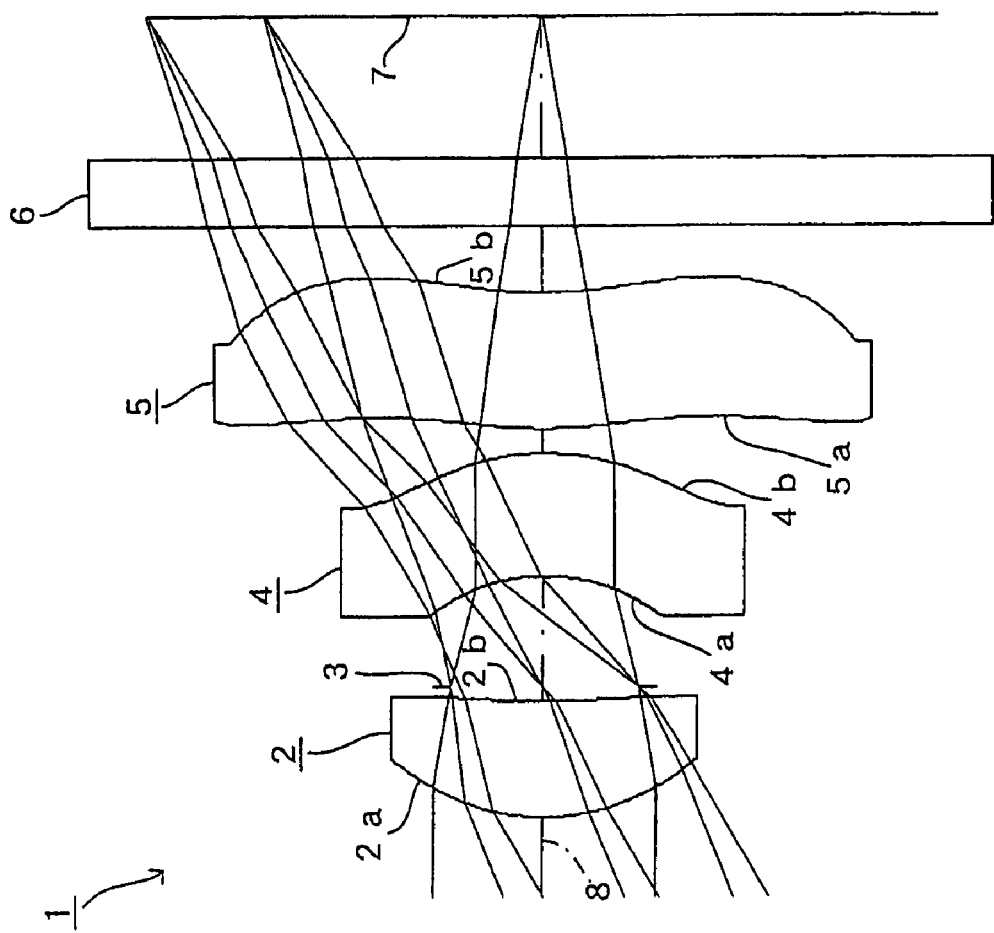
FIG. 30 is a schematic diagram for showing a FIFTEENTH EXAMPLE of the imaging lens according to the present invention.

FIG. 30 shows a FIFTEENTH EXAMPLE of the present invention. In the example, as in the FIRST EXAMPLE, a cover glass serving as the filter 6 is disposed between the second face 5b of the third lens 5 and the image-taking surface 7.

The imaging lens 1 of the FIFTEENTH EXAMPLE was set under the following conditions:

| Lens Data fl = 2.91 mm, $f_1$ = 2.41 mm, $f_2$ = −17.94 mm, F no = 2.8, ω = 63.6° | | | | |
|---|---|---|---|---|
| Face Number | r | d | nd | νd |
| (Object Point) | | | | |
| 1(First Face of First Lens) | 1.06 | 0.51 | 1.5310 | 56 |
| 2(Second Face of First Lens) | 5.13 | 0.06 | | |
| 3(Diaphragm) | 0.00 | 0.49 | | |
| 4(First Face of Second Lens) | −0.87 | 0.55 | 1.5850 | 30 |
| 5(Second Face of Second Lens) | −1.16 | 0.11 | | |
| 6(First Face of Third Lens) | 2.06 | 0.60 | 1.5310 | 56 |
| 7(Second Face of Third Lens) | 1.85 | 0.30 | | |
| 8(First Face of Cover Glass) | 0.000 | 0.30 | 1.5168 | 64 |
| 9(Second Face of Cover Glass) | 0.000 | | | |

-continued

Lens Data
fl = 2.91 mm, $f_1$ = 2.41 mm, $f_2$ = −17.94 mm, F no = 2.8, ω = 63.6°

(Image Surface)

| Face Number | k | A | B | C | D |
|---|---|---|---|---|---|
| 1 | −1.1 | 1.1E−1 | 8.0E−2 | 5.7E−2 | −4.5E−1 |
| 2 | 0 | −2.2E−2 | 3.2E−2 | −1.7 | 3.2 |
| 4 | 7.1E−1 | 4.6E−1 | −2.4 | 9.7 | −1.1E+1 |
| 5 | −5.4E−1 | 4.4E−3 | −1.8E−1 | 1.0 | −6.2E−1 |
| 6 | −1.4E+1 | −2.8E−1 | 2.4E−1 | −1.0E−1 | 1.7E−2 |
| 7 | −1.4E+1 | −1.3E−1 | 1.6E−2 | 2.2E−3 | −2.5E−3 |

Under such conditions, $f_2/fl=-6.2$ was achieved, thereby satisfying the expression (1). $f_1/fl=0.83$ was achieved, thereby satisfying the expression (2). $(r_5+r_6)/(r_5-r_6)=19$ was achieved, thereby satisfying the expression (3). $r_5/fl=0.71$ was achieved, thereby satisfying the expression (4). $r_1/r_2=0.21$ was achieved, thereby satisfying the expression (5).

Figure 31:
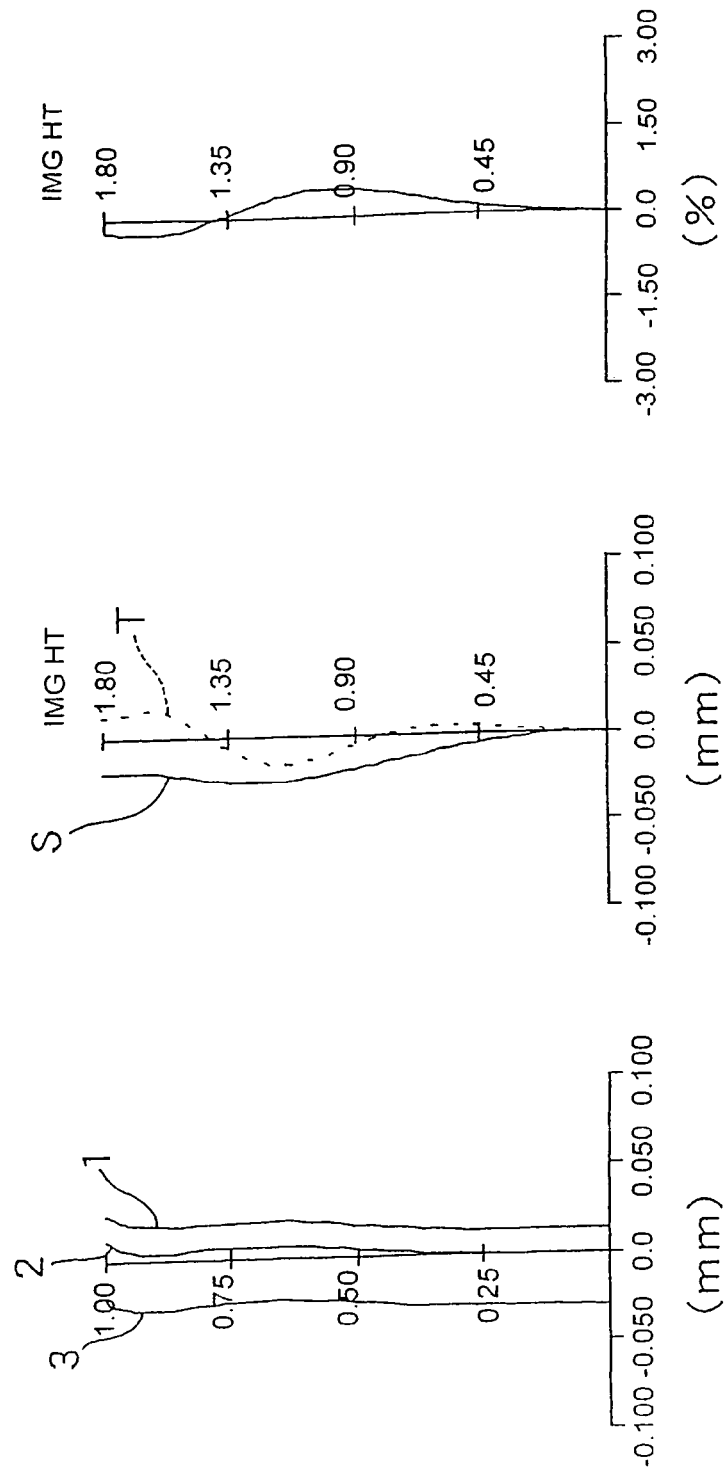
FIG. 31 shows graphs for describing the spherical aberration, astigmatism, and distortion of the imaging lens shown in FIG. 30.

FIG. 31 shows the spherical aberration, the astigmatism and the distortion in the imaging lens 1 of the FIFTEENTH EXAMPLE.

According to the result, each of the spherical aberration, the astigmatism, and the distortion was almost satisfied. It can be seen from the result that a sufficiently excellent optical property can be obtained.

The present invention is not limited to the above-described embodiment. Various modifications can be made as required.

For example, a light-transmitting material other than resin material can be suitably used as the material for the first lens, the second lens, and the third lens.

What is claimed is:

1. An imaging lens used for forming an image of an object on an image-taking surface of an image sensor element, comprising:

in order from an object side to an image surface side, a first lens that is a meniscus lens having a positive power whose convex surface faces the object side, a diaphragm, a second lens that is a meniscus lens having a negative power whose convex surface faces the image surface side, and a third lens that is a meniscus lens having a negative power whose convex surface faces the object side, wherein conditions expressed by the following expressions (1) and (2) are to be satisfied:

$$-130 \leq f_2/fl \leq -6 \quad (1)$$

$$0.8 \leq f_1/fl \leq 1 \quad (2)$$

where,
fl: focal distance of the entire lens system
$f_1$: focal distance of the first lens
$f_2$: focal distance of the second lens.

2. An imaging lens according to claim 1, wherein:
a condition expressed by a following expression (3) is to be further satisfied:

$$10 \leq (r_5+r_6)/(r_5-r_6) \leq 25 \quad (3)$$

where,
$r_5$: center radius curvature of the object side face of the third lens
$r_6$: center radius curvature of the image surface side face of the third lens.

3. An imaging lens according to claim 1, wherein:
a condition expressed by a following expression (4) is to be further satisfied:

$$0.5 \leq r_5/fl \leq 1.1 \quad (4).$$

4. An imaging lens according to claim 1, wherein:
a condition expressed by a following expression (5) is to be further satisfied:

$$0 < r_1/r_2 \leq 0.5 \quad (5)$$

where,
$r_1$: center radius curvature of the object side face of the first lens
$r_2$: center radius curvature of the image surface side face of the first lens.

5. An imaging device comprising the imaging lens according to any one of claims 1 to 4 and an image sensor element.

* * * * *